(12) United States Patent
Son et al.

(10) Patent No.: US 12,342,354 B2
(45) Date of Patent: *Jun. 24, 2025

(54) SIGNALLING METHOD THROUGH RESOURCE ALLOCATION IN WIRELESS COMMUNICATION SYSTEM AND WIRELESS COMMUNICATION TERMINAL

(71) Applicant: WILUS INSTITUTE OF STANDARDS AND TECHNOLOGY INC., Gyeonggi-do (KR)

(72) Inventors: Juhyung Son, Gyeonggi-do (KR); Geonjung Ko, Gyeonggi-do (KR); Jinsam Kwak, Gyeonggi-do (KR); Sanghyun Kim, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,838

(22) Filed: Mar. 15, 2024

(65) Prior Publication Data

US 2024/0237008 A1    Jul. 11, 2024

Related U.S. Application Data

(63) Continuation of application No. 17/112,738, filed on Dec. 4, 2020.

(30) Foreign Application Priority Data

Dec. 5, 2019 (KR) .......... 10-2019-0160356
Jan. 15, 2020 (KR) .......... 10-2020-0005135
Feb. 12, 2020 (KR) .......... 10-2020-0016726

(51) Int. Cl.
*H04W 72/23* (2023.01)
*H04H 20/95* (2008.01)
(Continued)

(52) U.S. Cl.
CPC ............ *H04W 72/23* (2023.01); *H04H 20/95* (2013.01); *H04W 72/0453* (2013.01); *H04W 72/121* (2013.01)

(58) Field of Classification Search
CPC . H04W 84/12; H04W 72/23; H04W 72/0453; H04W 72/121; H04L 1/0041;
(Continued)

(56) References Cited

U.S. PATENT DOCUMENTS 11,128,515 B2* 9/2021 Park .................... H04L 27/2602
2004/0258409 A1* 12/2004 Sadananda ............ H04L 45/02
398/50

(Continued)

FOREIGN PATENT DOCUMENTS

CN    107251472    10/2017
CN    107820683    3/2018
(Continued)

OTHER PUBLICATIONS

Hearing Notice dated Feb. 20, 2024 for Indian Patent Application No. 202227038108.
(Continued)

*Primary Examiner* — Jung Liu
(74) *Attorney, Agent, or Firm* — WOMBLE BOND DICKINSON (US) LLP

(57) ABSTRACT

Disclosed is a method for receiving data by a terminal in a wireless communication system. The terminal may receive a physical protocol data unit (physical layer protocol data unit: PPDU) from an access point (APAP) and decode the received PPDU. The PPDU may include a universal signal (U-SIG) field and an extremely high throughput (EHT)-SIG field including at least one content channel, and the U-SIG field may include a bandwidth field indicating the total bandwidth via which the PPDU is transmitted. The total
(Continued)

bandwidth is divided into at least one segment, and at least one of field among same fields includes same information except for a resource unit allocation (RU allocation) field between a first content channel and a second content channel in the same segment among the at least one segment when the at least one content channel is composed of a first content channel and a second content channel.

16 Claims, 38 Drawing Sheets

(51) Int. Cl.
*H04W 72/0453* (2023.01)
*H04W 72/121* (2023.01)

(58) Field of Classification Search
CPC ......... H04L 1/04; H04L 1/0061; H04L 69/22; H04L 1/00; H04L 1/0004; H04L 5/0007; H04L 27/34; H04L 27/36; H04L 1/001; H04L 5/0044; H04L 5/0037; H04L 27/261; H04L 1/0057; H04L 1/0025; H04L 1/08; H04H 20/95; H04B 7/0452
See application file for complete search history.

(56) References Cited

U.S. PATENT DOCUMENTS

| | | | |
|---|---|---|---|
| 2014/0133488 A1* | 5/2014 | Patel ................. | H04L 49/3063 370/392 |
| 2016/0174200 A1 | 6/2016 | Seok | |
| 2016/0182146 A1* | 6/2016 | Schmidtke .......... | H04J 14/0257 398/2 |
| 2017/0163394 A1 | 6/2017 | Choi et al. | |
| 2017/0171878 A1 | 6/2017 | Chun et al. | |
| 2017/0223693 A1 | 8/2017 | Kim et al. | |
| 2017/0359158 A1 | 12/2017 | Lim et al. | |
| 2017/0373816 A1 | 12/2017 | Son et al. | |
| 2019/0116513 A1 | 4/2019 | Verma et al. | |
| 2019/0187690 A1* | 6/2019 | Cella ............... | G05B 19/41845 |
| 2019/0207623 A1 | 7/2019 | Lee et al. | |
| 2020/0267653 A1 | 8/2020 | Son et al. | |
| 2021/0212035 A1 | 7/2021 | Son et al. | |
| 2022/0278775 A1* | 9/2022 | Huang ................. | H04L 1/1607 |
| 2022/0279562 A1* | 9/2022 | Park ....................... | H04L 69/22 |

FOREIGN PATENT DOCUMENTS

| | | |
|---|---|---|
| JP | 2019-503151 | 1/2019 |
| KR | 10-2018-0088470 | 8/2018 |
| KR | 10-2019-0097102 | 8/2019 |
| WO | 2018/128530 | 7/2018 |
| WO | 2021/112644 | 6/2021 |

OTHER PUBLICATIONS

International Search Report for PCT/KR2020/017733 mailed on Mar. 26, 2021 and its English Translation from WIPO (now published as WO 2021/112644).
Written Opinion of the International Searching Authority for PCT/KR2020/017733 mailed on Mar. 21, 2021 and its English Translation from WIPO (now published as WO 2021/112644).
International Preliminary Report on Patentability (Chapter I) for PCT/KR2020/017733 issued on May 17, 2022 and its English Translation from WIPO (now published as WO 2021/112644).
Office Action dated Jun. 10, 2022 for Korean Patent Application No. 10-2021-7037459 and its English Translation provided by Applicant's foreign counsel.
Office Action dated Oct. 18, 2022 for Indian Patent Application No. 202227038108.
Office Action dated Dec. 22, 2022 for Korean Patent Application No. 10-2021-7037459 and its English Translation provided by Applicant's foreign counsel.
Office Action dated Jun. 12, 2023 for Japanese Patent Application No. 2022-534294 and its English Translation provided by Applicant's foreign counsel.
Mengshi Hu (Huawei) et al.: "Preamble Structure and SIG Contents", doc.: IEEE 802.11-20/0029r1, Jan. 13, 2020, slides 1-22.
Bin Tian et al.: "Further Thoughts on 11be Tone Plan", doc.: IEEE 802.11-19/1521r2, Nov. 13, 2019, slides 1-13.
Ron Porat et al.: "Multi-RU Support", doc.: IEEE 802.11-19/1908r2, Jan. 13, 2020, slides 1-15.
John (Ju-Hyung) Son (Wilus, Inc.) et al.: "Preamble Puncturing and SIG-B Signaling", doc.: IEEE 802.11-19/1606r0, Nov. 8, 2019, slides 1-14.
Office Action dated Dec. 4, 2023 for Japanese Patent Application No. 2022-534294 and its English Translation provided by Applicant's foreign counsel.
Office Action dated Jan. 25, 2024 for Chinese Patent Application No. 202080084351.9 and its English Translation provided by Applicant's foreign counsel.
Notice of Allowance dated Nov. 15, 2023 for U.S. Appl. No. 17/112,738 (now published as US 2021/0212035).
Office Action dated Jul. 26, 2023 for U.S. Appl. No. 17/112,738 (now published as US 2021/0212035).
Notice of Allowance dated May 30, 2024 for Taiwanese Patent Application No. 109143108 and its English translation provided by the Applicant's foreign counsel.
Rejection dated Jun. 24, 2024 for Japanese Patent Application No. 2022-534294 and its English translation provided by the Applicant's foreign counsel.
Decision to Reject the Amendments dated Jun. 24, 2024 for Japanese Patent Application No. 2022-534294 and its English translation provided by the Applicant's foreign counsel.
Notice of Allowance dated Jul. 2, 2024 for Chinese Patent Application No. 202080084351.9 and its English translation provided by the Applicant's foreign counsel.
Notice of Allowance dated Aug. 16, 2024 for U.S. Appl. No. 17/112,738.
Office Action dated Aug. 29, 2024 for Vietnamese Patent Application No. 1-2022-04234 and its English translation provided by Applicant's foreign counsel.
Office Action dated Nov. 9, 2024 for Korean Patent Application No. 10-2023-7041010 and its English translation provided by Applicant's foreign counsel.
Office Action dated Jan. 15, 2025 for Taiwanese Patent Application No. 109143108 and its English translation provided by Applicant's foreign counsel.
Notice of Allowance dated Feb. 18, 2025 for Japanese Patent Application No. 2022-534294 and its English translation provided by Applicant's foreign counsel.
Notice of Allowance dated Feb. 25, 2025 for Korean Patent Application No. 10-2023-7041010 and its English translation provided by Applicant's foreign counsel.

* cited by examiner

FIG. 32
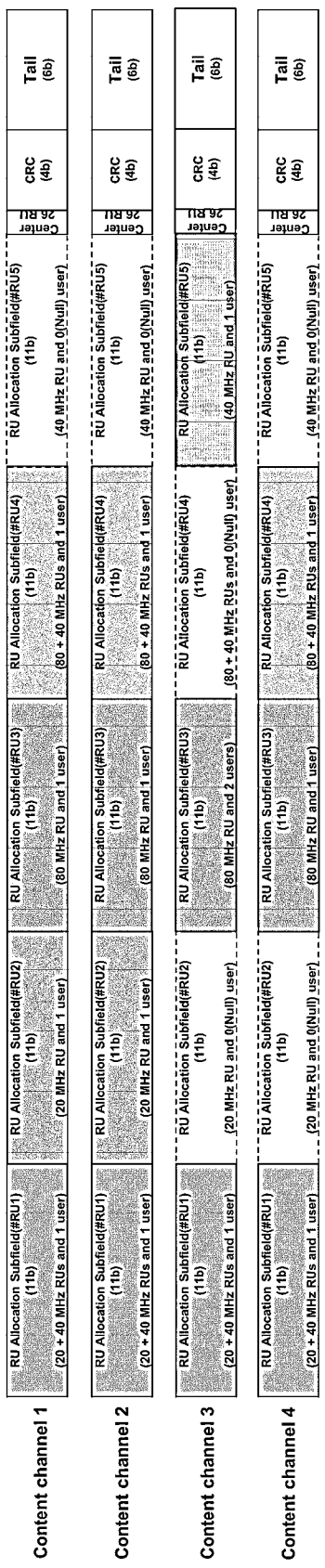
(a) RU Allocation subfields
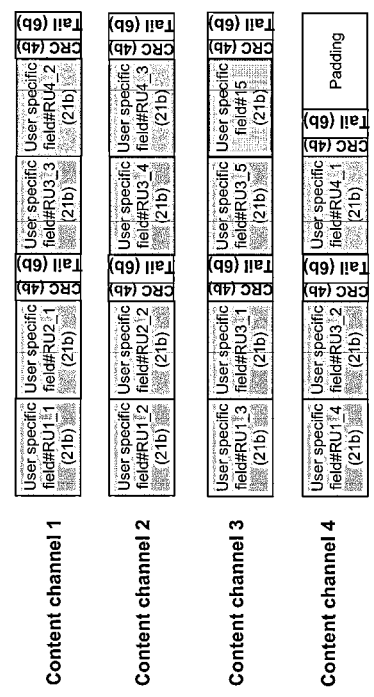
(b) User specific fields

SIGNALLING METHOD THROUGH RESOURCE ALLOCATION IN WIRELESS COMMUNICATION SYSTEM AND WIRELESS COMMUNICATION TERMINAL

CROSS-REFERENCE TO RELATED APPLICATIONS

This application is a continuation of U.S. patent application Ser. No. 17/112,738 filed on Dec. 4, 2020, which claims the priority to Korean Patent Application No. 10-2019-0160356 filed in the Korean Intellectual Property Office on Dec. 5, 2019, Korean Patent Application No. 10-2020-0005135 filed in the Korean Intellectual Property Office on Jan. 15, 2020, and Korean Patent Application No. 10-2020-0016726 filed in the Korean Intellectual Property Office on Feb. 12, 2020, the entire contents of which are incorporated herein by reference.

TECHNICAL FIELD

The present invention relates to a wireless communication system, and more particularly, to a method and device for transmitting information for allocation of discontinuous channels in a wireless communication system.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11 ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHZ, IEEE 802.11 ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DETAILED DESCRIPTION OF THE INVENTION

Technical Problem

An aspect of the present invention is to provide a high-speed wireless LAN service for a new multimedia application, as described above.

An aspect of the present invention is to provide a resource allocation method and device for allocating discontinuous channels to a terminal when a resource is allocated to the terminal.

An aspect of the present invention is to provide a data format for providing information for a terminal to recognize discontinuously allocated resources when resources are allocated to a plurality of terminals.

Technical tasks to be achieved in the specification are not limited to the technical tasks mentioned above, and other technical tasks that are not mentioned may be clearly understood by those skilled in the art on the basis of the following descriptions.

Technical Solution

A terminal, which transmits a physical uplink shared channel (PUSCH) to a base station in a wireless communication system, receives a physical protocol data unit (physical layer protocol data unit: PPDU) from an access point (AP), and decodes the received PPDU, wherein: the PPDU includes a universal signal (U-SIG) field and an extremely high throughput (EHT)-SIG field including at least one content channel; the PPDU is a PPDU transmitted to a plurality of terminals by a multi-user (MU) transmission operation by the AP; the U-SIG field includes a bandwidth field indicating the total bandwidth in which the PPDU is transmitted; the total bandwidth is divided into at least one segment; and at least one of field among same fields includes same information except for a resource unit allocation (RU allocation) field between a first content channel and a second content channel in the same segment among the at least one segment when the at least one content channel is composed of a first content channel and a second content channel.

In the present invention, the at least one field includes at least one of a low density parity check code (LDPC) extra symbol segment field, a space-time block coding (STBC) field, a pre-FEC padding factor field, or a GI+long training field (LTF) size field.

In the present invention, the at least one segment includes a first segment and a second segment, and each of the first content channel and the second content channel is repeatedly transmitted in each predetermined frequency band within the first segment or the second segment.

In the present invention, at least one content channel transmitted in the first segment and at least one content channel transmitted in the second segment, which have the same index, include different information.

In the present invention, if a first content channel and a second content channel are transmitted in the first segment, and a first content channel and a second content channel are transmitted in the second segment, the first content channel and second content channels transmitted in the first segment and the first content channel and second content channels transmitted in the second segment are repeatedly transmitted at predetermined frequency intervals.

In the present invention, the first and second content channels transmitted in the first segment include a first common field including at least one field including the same value, and the first content channel and second content channels transmitted in the second segment include a second common field including at least one field including the same value.

In the present invention, the at least one field included in the first common field and the at least one field included in the second common field include different information.

In the present invention, the U-SIG field and/or the EHT-SIG field of the PPDU transmitted in the first segment have values differing from those of the U-SIG field and/or the EHT-SIG field of the PPDU transmitted in the second segment.

In the present invention, the PPDU further includes puncturing information indicating a puncturing pattern of at least one resource unit allocated to the terminal.

In the present invention, the at least one resource unit is recognized by the terminal on the basis of a combination of at least one of the puncturing information, a resource unit allocation field, and a station identifier (STA ID) field, the resource unit allocation field indicates a configuration of a resource unit via which the PPDU is transmitted, and the STA ID field indicates an ID of a terminal to which each resource unit is allocated based on the configuration of the resource unit.

In the present invention, if a plurality of resource units are allocated to the terminal, the plurality of resource units include the same or different number of tones, and the plurality of resource units are allocated discontinuously.

In the present invention, the EHT-SIG field includes a common field, and the U-SIG field includes a specific field related to whether a resource unit allocation field for resource unit allocation is included in the EHT-SIG field.

In the present invention, if the specific field indicates application of non-OFDMA, the resource unit allocation field is not included in the EHT-SIG.

The present invention provides a method including: receiving a physical protocol data unit (physical layer protocol data unit: PPDU) from an access point (AP); and decoding the received PPDU, wherein: the PPDU includes a universal signal (U-SIG) field and an extremely high throughput (EHT)-SIG field including at least one content channel; the PPDU is a PPDU transmitted to a plurality of terminals by a multi-user (MU) transmission operation by the AP; the U-SIG field includes a bandwidth field indicating the total bandwidth in which the PPDU is transmitted; the total bandwidth is divided into at least one segment; and at least one of field among same fields includes same information except for a resource unit allocation (RU allocation) field between a first content channel and a second content channel in the same segment among the at least one segment when the at least one content channel is composed of a first content channel and a second content channel.

Advantageous Effects

According to an embodiment of the present invention, discontinuous channel allocation information can be efficiently signaled.

According to an embodiment of the present invention, in a contention-based channel access system, an overall resource use rate can be increased and performance of a WLAN system can be improved.

According to an embodiment of the present invention, by notifying a terminal of information for recognition of discontinuously allocated resources, the terminal can efficiently recognize the allocated resources so as to receive data.

According to an embodiment of the present invention, if data is transmitted to a plurality of terminals, information common to each terminal is transmitted via the same packet format, thereby reducing signaling overhead.

The effects obtainable in the present invention are not limited to the above-mentioned effects, and other effects that are not mentioned may be clearly understood by those skilled in the art to which the present invention belongs, from descriptions below.

BRIEF DESCRIPTION OF THE DRAWINGS

FIG. 31 and FIG. 32 illustrate an embodiment of four content channels for an OFDMA MU PPDU of a specific frequency band according to an embodiment of the present invention;

MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

Hereinafter, in the present invention, a field and a subfield may be interchangeably used.

Figure 1:
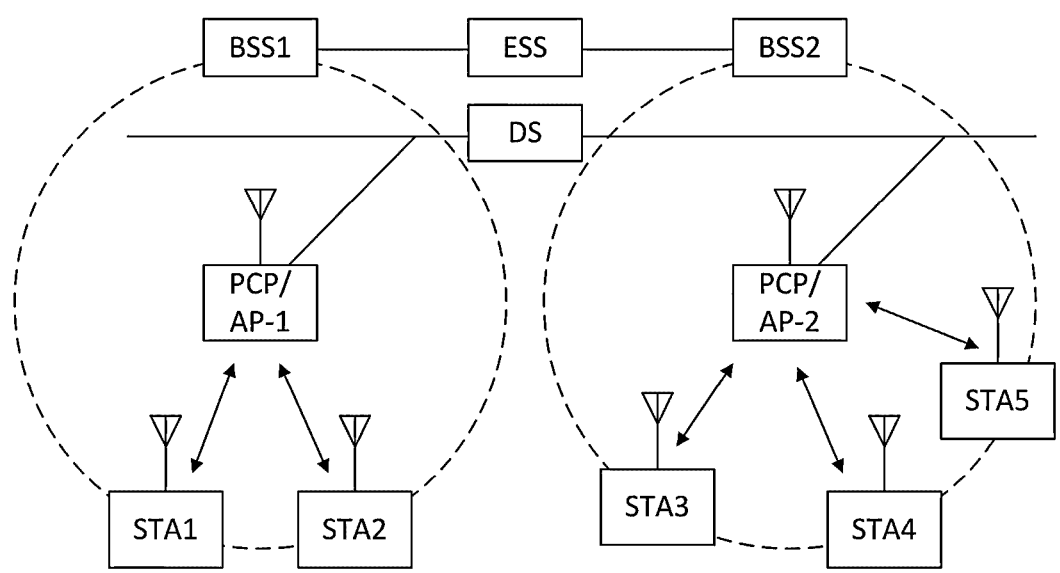
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
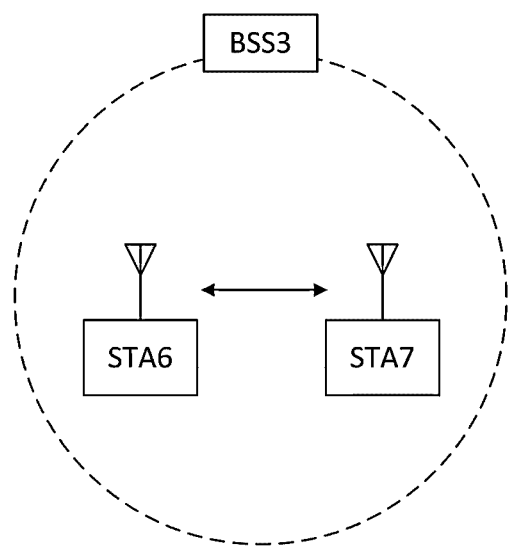
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
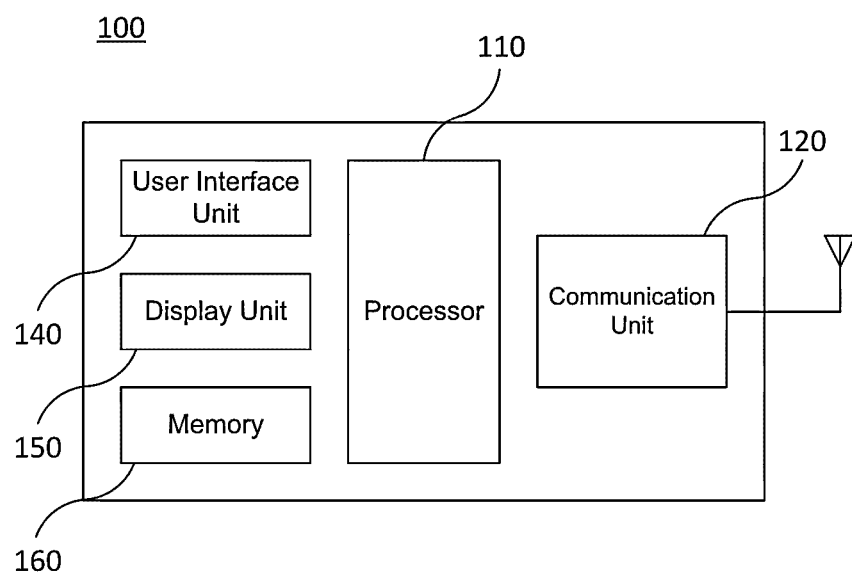
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHZ, 6 GHZ and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
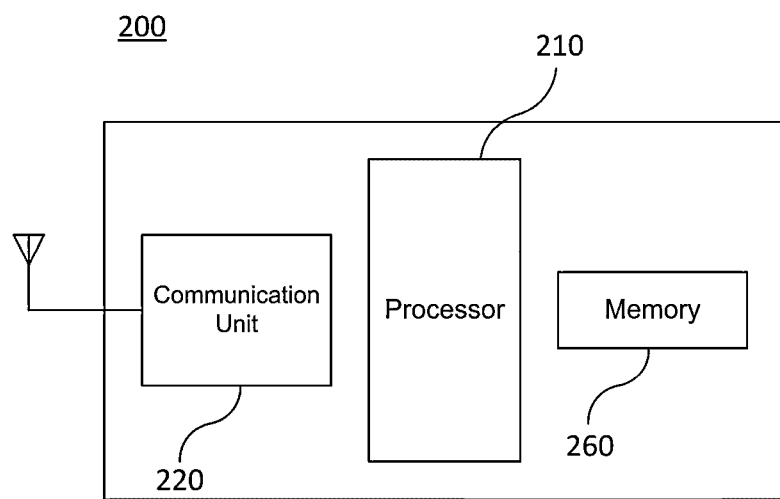
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHZ, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
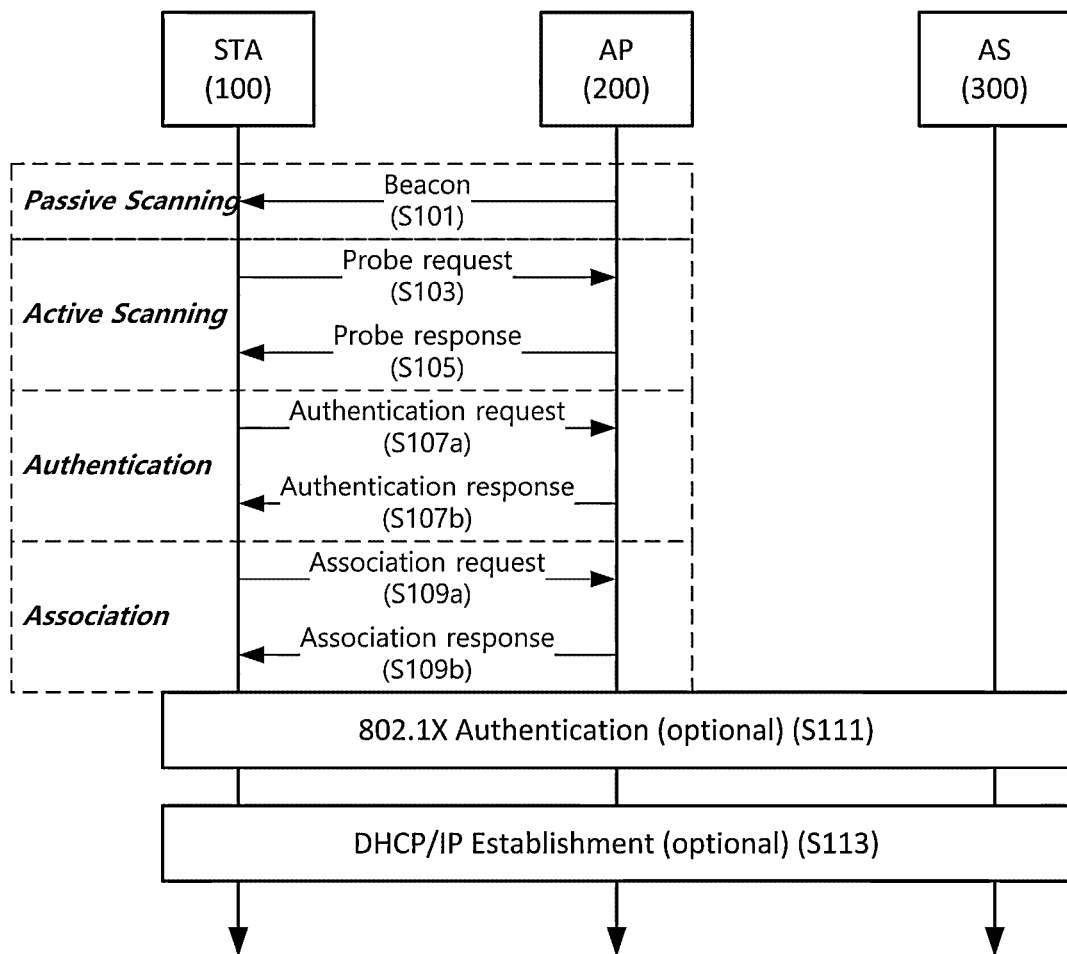
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
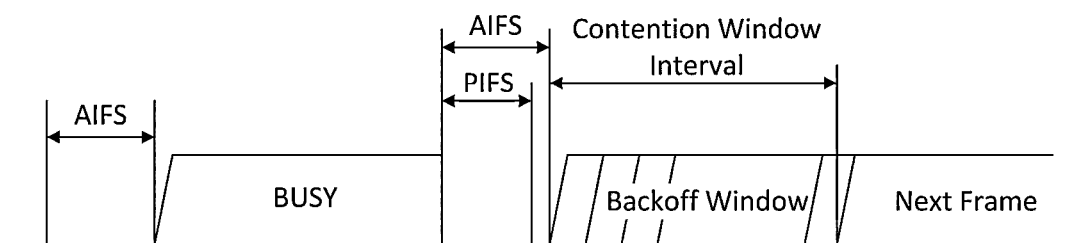
FIG. 6 illustrates a carrier sense multiple access (CSMA)/ collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Examples of Various PPDU Formats

Figure 7:
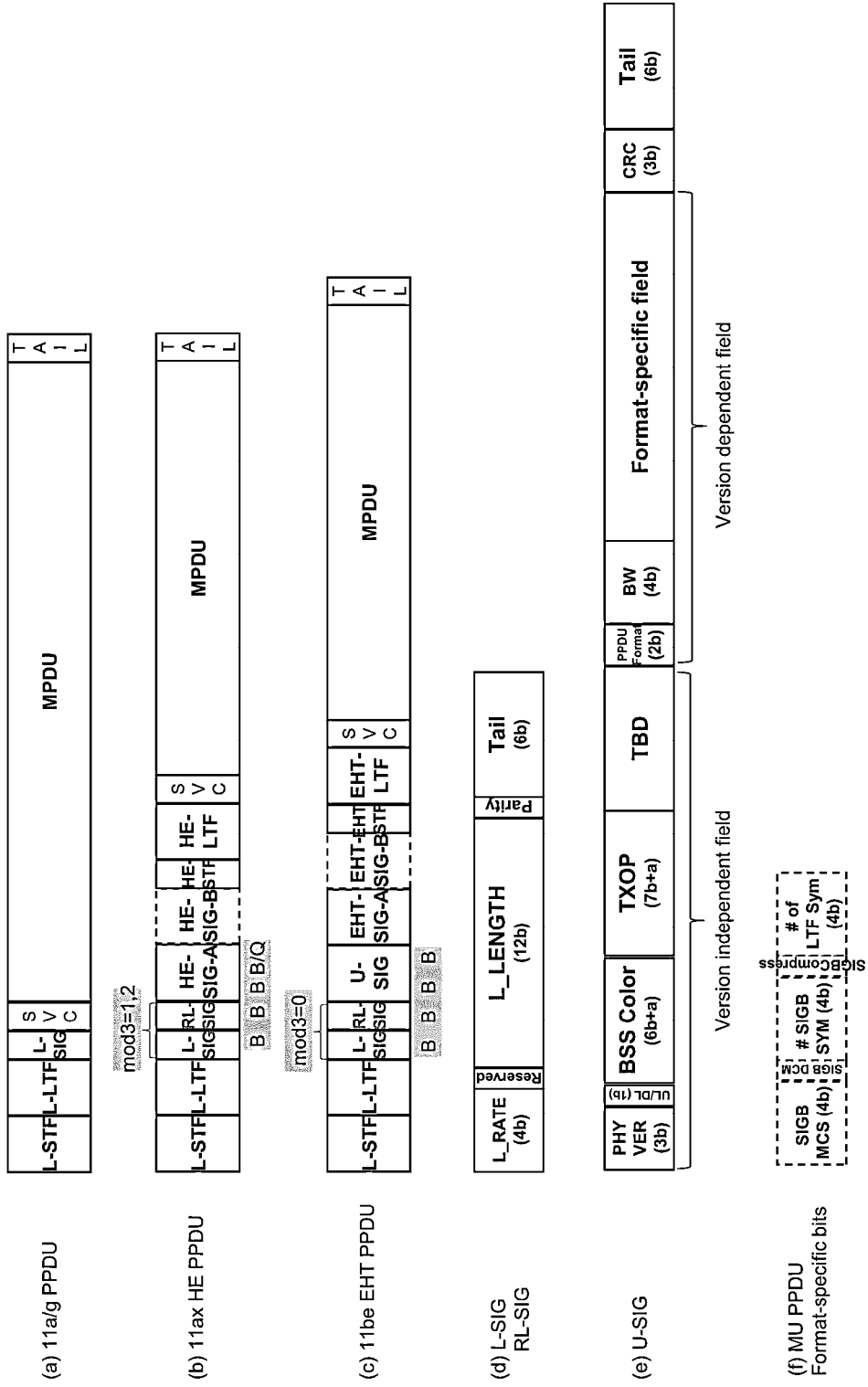
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(a) illustrates an embodiment of a legacy PPDU format based on 802.11a/g, FIG. 7(b) illustrates an embodiment of an HE PPDU format based on 802.11ax, and FIG. 7(c) illustrates an embodiment of a non-legacy PPDU (i.e., EHT PPDU) format based on 802.11be. FIG. 7(d) illustrates detailed field configurations of RL-SIG and L-SIG commonly used in the PPDU formats.

Referring to FIG. 7(a), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(b), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(c), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=½ are applied in L-SIG, and therefore the L-SIG may include a total of 24 bits of information. FIG. 7(d) illustrates a 24-bit information configuration of L-SIG.

Referring to FIG. 7(d), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-QAM/64-QAM, etc. and an inefficiency of ½, ⅔, ¾, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

First, a method of interpreting the length of a PPDU using a L_LENGTH field by a legacy terminal or a non-legacy terminal is as follows. When the L_RATE field is set to 6 Mbps, 3 bytes (i.e., 24 bits) can be transmitted for 4 us, which is one symbol duration of 64 FFT. Therefore, by adding 3 bytes corresponding to the SVC field and the Tail field to the value of the L_LENGTH field and dividing it by 3 bytes, which is the transmission amount of one symbol, the number of symbols after the L-SIG is obtained on the 64FFT basis. The length of the corresponding PPDU, that is, the reception time (i.e., RXTIME) is obtained by multiplying the obtained number of symbols by 4 us, which is one symbol duration, and then adding a 20 us which is for transmitting L-STF, L-LTF and L-SIG. This can be expressed by the following Equation 1.

$$RXTIME(us) = \left(\left\lceil \frac{L\_LENGTH + 3}{3} \right\rceil\right) \times 4 + 20 \quad \text{[Equation 1]}$$

In this case, denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH(byte) = \left(\left\lceil \frac{TXTIME - 20}{4} \right\rceil\right) \times 3 - 3 \quad \text{[Equation 2]}$$

Herein, TXTIME is the total transmission time constituting the corresponding PPDU, and is expressed by Equation 3 below. In this case, TX represents the transmission time of X.

$$TXTIME(us) = \\ T_{L-STF} + T_{L-LTF} + T_{L-SIG} + T_{RL-SIG} + T_{U-SIG} + (T_{EHT-SIG-A}) + \\ (T_{EHT-SIG-B}) + T_{EHT-STF} + N_{EHT-LTF} \cdot T_{EHT-LTF} + T_{DATA}$$
[Equation 3]

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to FIG. 7(e), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

Figure 17:
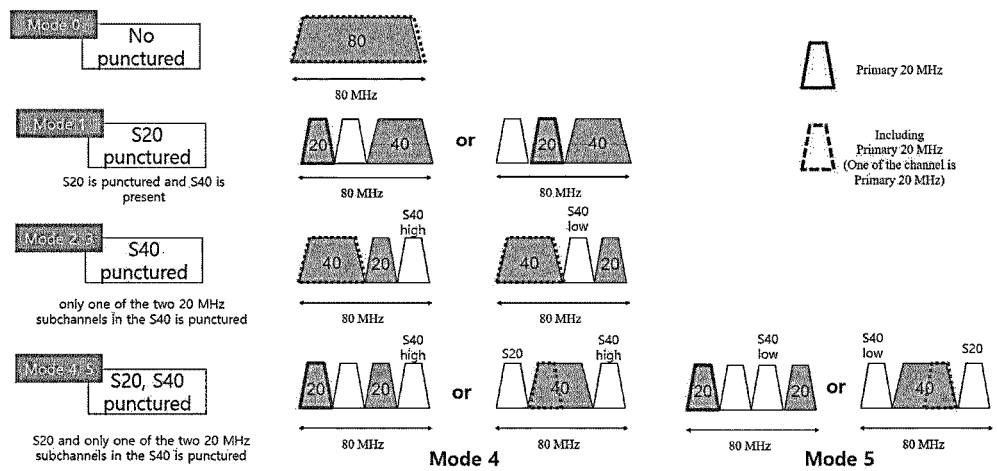
FIG. 17 illustrates an example of a discontinuous channel segmented according to frequency segmentation according to an embodiment of the present invention.
Figure 18:
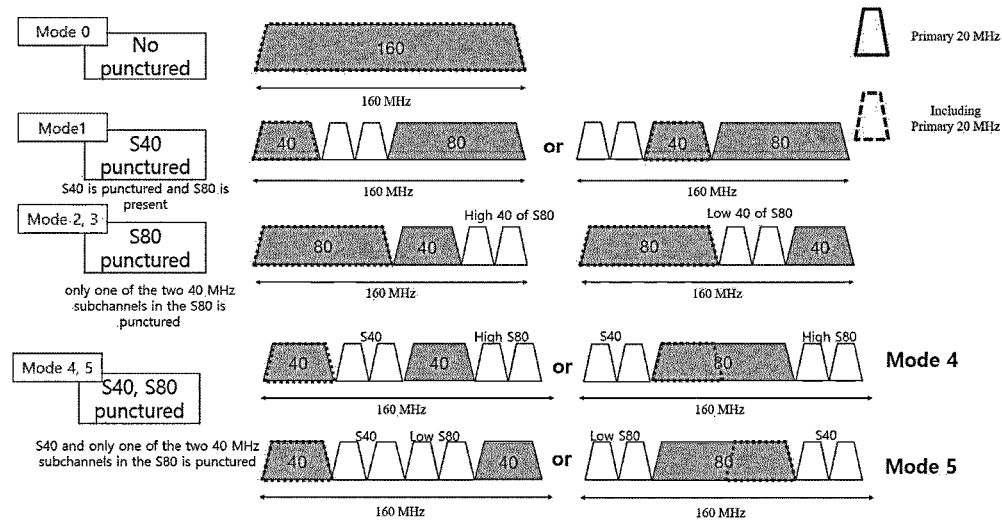
FIG. 18 illustrates an example of a discontinuous channel for single user transmission according to an embodiment of the present invention.
Figure 19:
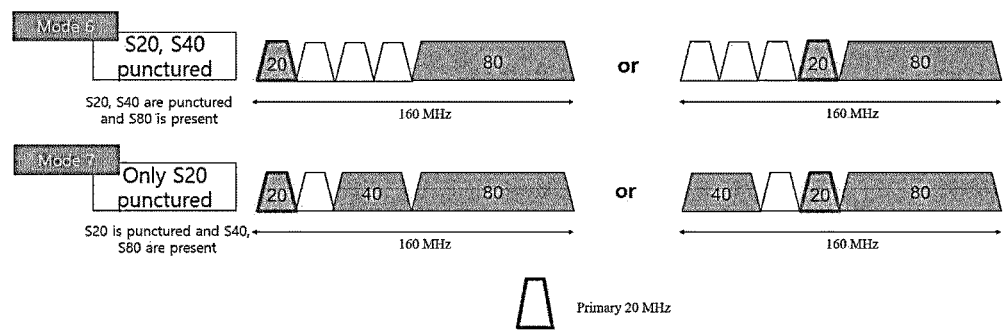
FIG. 19 illustrates an example of a discontinuous channel for a specific bandwidth according to an embodiment of the present invention.

The present invention proposes a technique for signaling a discontinuous channel type of an SU PPDU, and illustrates a discontinuous channel type determined according to the proposed technique. The present invention also proposes a technique for signaling each of puncturing types of primary 160 MHz and secondary 160 MHz in a 320 MHz BW configuration of an SU PPDU. The discontinuous channel type allowed when a discontinuous channel type regulation technique is applied, and a technique for signaling the discontinuous channel type in 3 bits are illustrated in FIG. 17 to FIG. 19.

An embodiment of the present invention proposes a technique for differently configuring a PPDU indicated by preamble puncturing BW values according to a PPDU format signaled in a PPDU format field. It is assumed that a BW field is 4 bits, and in a case of an EHT SU PPDU or a TB PPDU, EHT-SIG-A of 1 symbol may be additionally signaled after U-SIG, or EHT-SIG-A may not be signaled at all, so that, in consideration of this, it is necessary to completely signal up to 11 puncturing modes via only the BW field of U-SIG. However, in a case of an EHT MU PPDU, EHT-SIG-B is additionally signaled after U-SIG, so that up to 11 puncturing modes may be signaled in a method different from that of the SU PPDU. In a case of an EHT ER PPDU, a BW field may be configured to 1 bit to signal whether the EHT ER PPDU is a PPDU using a 20 MHz or 10 MHz band. Detailed puncturing patterns for each PPDU type will be described in detail later in FIG. 11 and FIG. 12.

FIG. 7(f) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
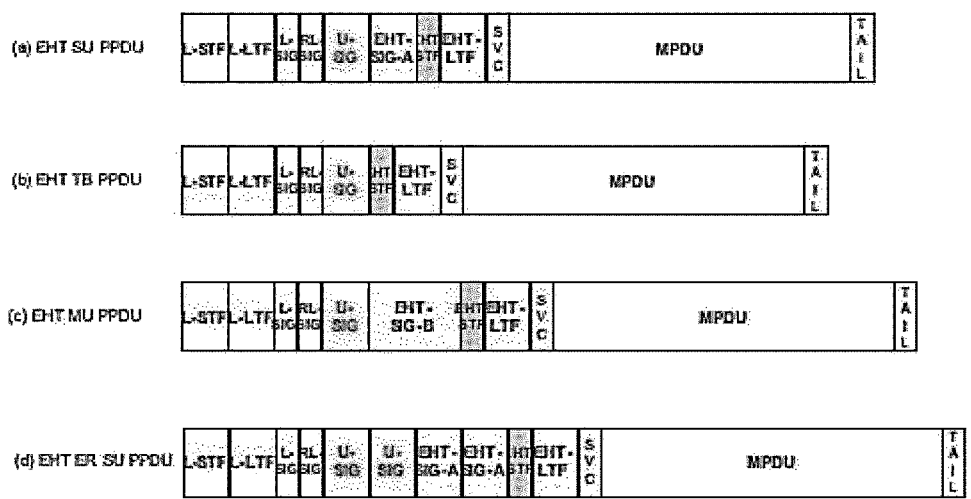
FIG. 8 illustrates an example of various extremely high throughput (EHT) physical protocol data unit (PPDU) formats and a method for indicating the same according to an embodiment of the present invention.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(a) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(b) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(c) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(d) shows an example of an EHT ER SU PPDU format used for single user transmission with an STA in an extended range. An EHT ER SU PPDU may be used for single user transmission with an STA of a wider range compared to the EHT SU PPDU described in FIG. 8(a), and a U-SIG field may be repeatedly located on a time axis.

The EHT MU PPDU described in FIG. 8(c) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

Figure 9:
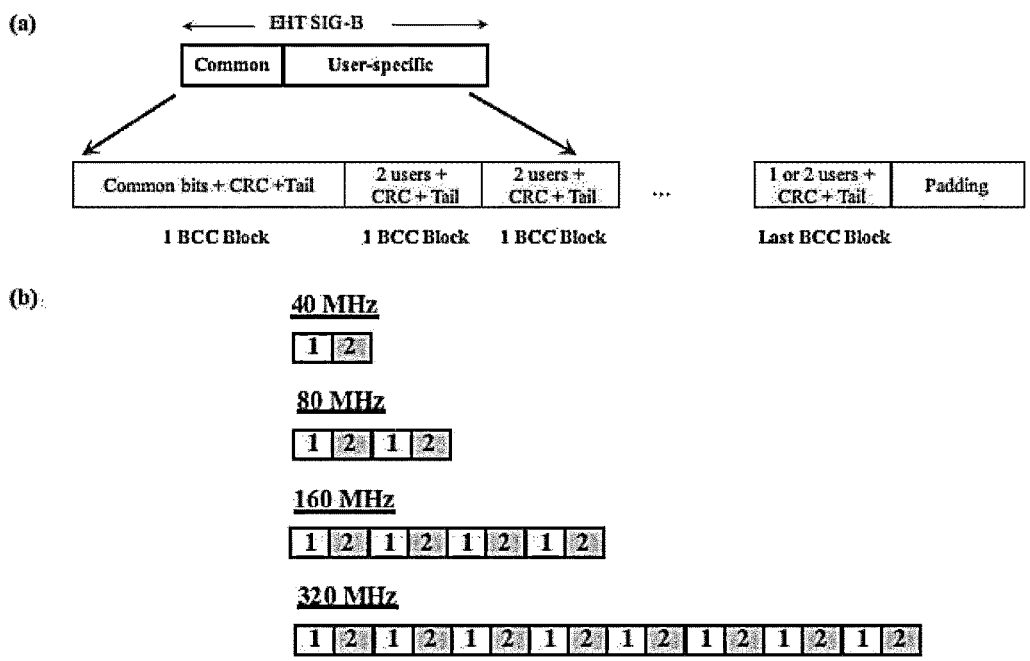
FIG. 9 illustrates an example of an encoding structure and a transmission method of an EHT-SIG field according to an embodiment of the present invention.

FIG. 9 illustrates an example of an encoding structure and a transmission method of an EHT-SIG field according to an embodiment of the present invention. FIG. 9(a) illustrates an encoding structure in which EHT-SIG-B is encoded, and FIG. 9(b) illustrates a transmission method of EHT-SIG-B in a bandwidth of 40 MHz or higher.

Referring to FIG. 9(a), EHT-SIG-B may include a common block field and a user specific field. The user-specific field may include at least one user field, and each user field may be listed in order of assigned users according to an arrangement of resource units indicated by a resource allocation (RA) field of the common block field.

The user specific field includes at least one user field, and the at least one user field is transmitted in units of user block fields. As described above, the user block field includes a combination of two user fields, a CRC field, and a tail field. If a total number of user fields is an odd number, a last user block field may include only one user field. Padding may be added at the end of EHT-SIG-B according to an OFDM symbol boundary.

Referring to FIG. 9(b), EHT-SIG-B is separately encoded in each 20 MHz band. EHT-SIG-B may include up to two contents, that is, EHT-SIG-B content channel 1 and EHT-SIG-B content channel 2, in a unit of 20 MHz. In FIG. 9(b), each box represents a 20 MHz band, and "1" and "2" in the box represent EHT-SIG-B content channel 1 and EHT-SIG-B content channel 2, respectively. Respective HE-SIG-B content channels in the total band are arranged according to a sequence of physical frequency bands. That is, HE-SIG-B content channel 1 is transmitted in a lowest frequency band, and HE-SIG-B content channel 2 is transmitted in a subsequent high-frequency band. This content channel configuration is repeated via content duplication in subsequent high-frequency bands. For example, for a first channel to a fourth channel in ascending frequency order, which constitute the total 80 MHz band, HE-SIG-B content channel 1 is transmitted in the first and third channels, and HE-SIG-B content channel 2 is transmitted in the second and fourth channels. Similarly, for a first channel to an eighth channel in ascending frequency order, which constitute the total 160 MHz band, HE-SIG-B content channel 1 is transmitted in the first, third, fifth, and seventh channels, and HE-SIG-B content channel 2 is transmitted in the second, fourth, sixth, and eighth channels. Likewise, for a first channel to a 16th channel in ascending frequency order, which constitute the total 320 MHz band, HE-SIG-B content channel 1 is transmitted in the first, third, fifth, seventh, 9th, 11th, 13th, and 15th channels, and HE-SIG-B content channel 2 is transmitted in the second, fourth, sixth, eighth, tenth, 12th, 14th, and 16th channels. If a terminal is capable of decoding HE-SIG-B content channel 1 via at least one channel and decoding HE-SIG-B content channel 2 via at least one other channel, the terminal may obtain information on an MU PPDU configuration of the total bandwidth. On the other hand, if the total bandwidth is 20 MHz, only one SIG-B content channel is transmitted.

Figure 10:
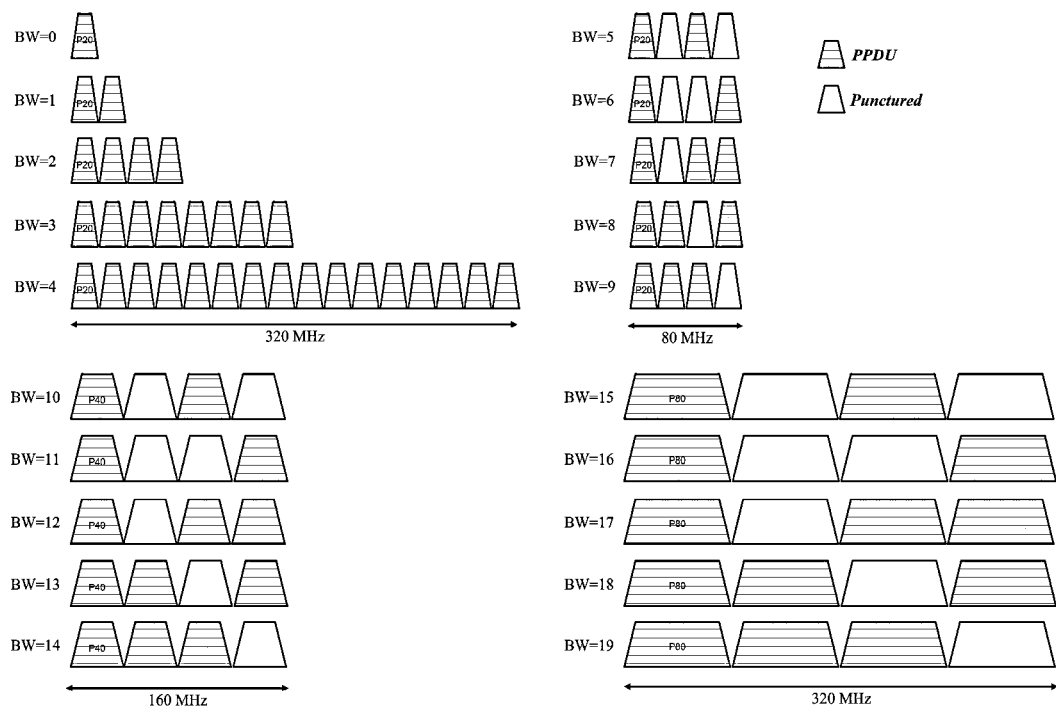
FIG. 10 illustrates an example of various BW modes of an EHT SU PPDU.

FIG. 10 illustrates an example of various BW modes of an EHT SU PPDU.

Referring to FIG. 10, in 801.11be, for EHT, a PPDU may be transmitted via a bandwidth of up to 320 MHz, wherein there is a problem in that the PPDU may be transmitted only if all channels are idle. In a case of 11ax using orthogonal frequency division multiplexing access (OFDMA), a preamble puncturing mode is possible in an MU PPDU in which an AP transmits a PPDU to a plurality of STAs, wherein the preamble puncturing mode is a mode in which only channels, the CCA results of which are idle at each 20 MHz at which the MU PPDU is transmitted, are combined to perform transmission. In a case of 11be, the preamble puncturing mode may be used even in an SU PPDU in which an AP performs transmission to a single STA. That is, when the AP transmits a PPDU to a plurality of STAs or transmits a PPDU to a single STA, even if all channels of the total bandwidth are not idle, only idle channels may be combined to transmit the PPDU. In a case of the SU PPDU, if a plurality of resource units are allocated to a single STA, the AP may transmit the PPDU to a single STA only in a channel of an idle resource unit by using the preamble puncturing mode.

Hereinafter, a BW indicator indicating a (maximum) bandwidth for transmission of the PPDU may be transmitted via a bandwidth field of U-SIG.

As illustrated in FIG. 10, modes of BW=0 to BW=4 are an embodiment of transmitting a PPDU by combining continuous channels without preamble puncturing. Modes of BW=5 to 9 are BW modes of the PPDU, in which channels, which remain after excluding busy channels from among 20 MHz sub-channels remaining after excluding a main 20 MHz channel in the total 80 MHz channel bandwidth, are combined to perform transmission. In a case of BW=5 and 6, a channel finally transmitted and occupied is 40 MHz, and in a case of BW7 to 9, 60 MHz is occupied. In order to perform preamble puncturing of the SU PPDU in the bandwidth of up to 80 MHz as described above, a transmitter may prepare A-MPDU, which is data to be transmitted for each 20 MHz RU, in a PSDU type, and then may transmit the PPDU only in 20 MHz bands including available P20 according to a CCA result immediately before transmission. Here, the type of the RU prepared for each 20 MHz band should be an individual 20 MHz RU type other than a 20 MHz RU within 80 MHz RU allocation of 11ax. This is because when data is transmitted with 242 RU allocation corresponding to 20 MHz within 80 MHz RU allocation, if a corresponding 20 MHz adjacent channel is punctured, an interference signal may also be leaked to the punctured channel.

Therefore, if preamble puncturing transmission is attempted, an STA preparing for transmission via an 80 MHz band in the SU PPDU may prepare four MHz transmission for each 20 MHz band, and then may transmit the prepared PSDUs on available 20 MHz channels according to the CCA result. In this case, if four PSDUs corresponding to four 20 MHz RUs constituting an 80 MHz transmission RU are generated and prepared, and then transmitted in a puncture mode according to the CCA result, interference may occur in the punctured channel. Hereinafter, FIG. 11 will be described as an example.

Figure 11:
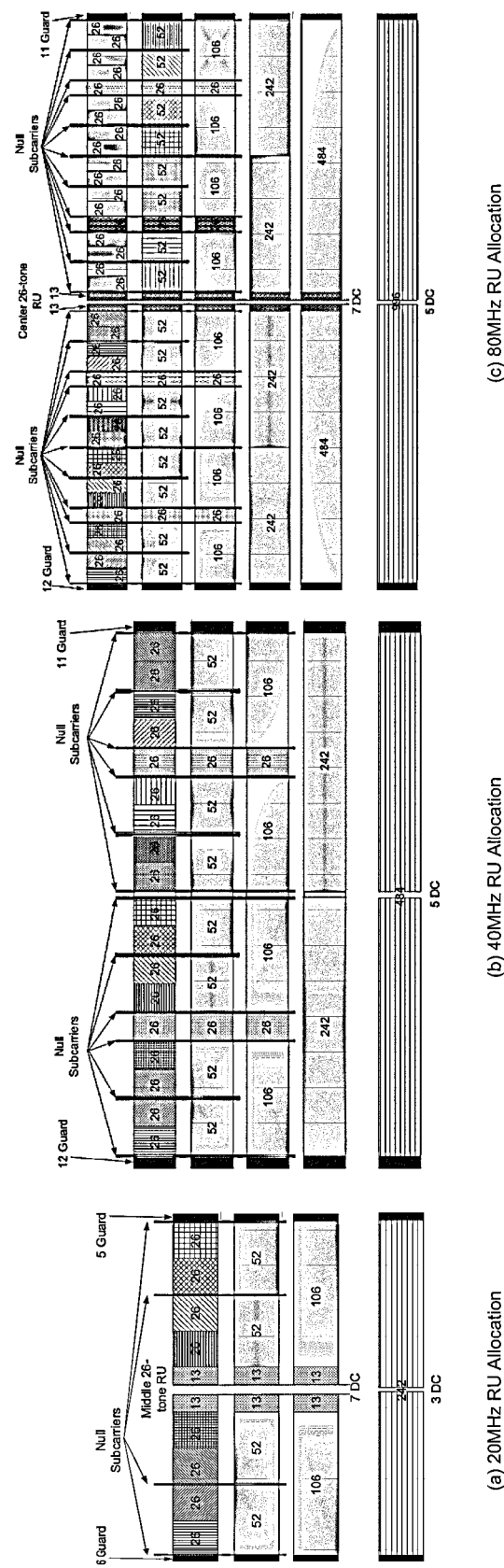
FIG. 11 illustrates RU allocation distribution for each of 20 MHz, 40 MHz, and 80 MHz used in 11ax and 11be.

FIG. 11 illustrates RU allocation distribution for each of 20 MHz, 40 MHz, and 80 MHz used in 11ax and 11be. 160 MHz may be implemented in a form in which an 80 MHz RU of FIG. 11(c) is repeated twice. 320 MHz may be implemented in a form in which 160 MHz is repeated twice, or the 80 MHz RU of FIG. 11(c) is repeated four times. 240 MHz is implemented in a form of 80 MHz+160 MHz or 160 MHz+80 MHz, and may thus be implemented in a form in which the 80 MHz RU of FIG. 11(c) is repeated three times.

In comparison of FIG. 11(a) and FIG. 11(c), in a case of (a) in which 20 MHz RU allocation is defined within the total 20 MHz band, guard carriers are located on the left and right of 242 carriers, whereas, in a case of (c) in which 20 MHz RU allocation is defined within the total 80 MHz band, transmission is performed with no guard carrier on the left and right of 242 carriers.

The modes of BW=10 to 14 of FIG. 10 are BW modes of a PPDU, in which channels, which remain after excluding busy channels from among sub-channels remaining after excluding 40 MHz channels including a main 20 MHz channel in the total 160 MHz channel bandwidth, are combined to perform transmission. In the case of BW=10 and 11, a channel finally transmitted and occupied is 80 MHz, and in the case of BW12 to 14, 120 MHz is occupied. In order to perform preamble puncturing of an SU PPDU in the bandwidth of up to 160 MHz as described above, a transmitter may prepare A-MPDU, which is data to be transmitted for each 40 MHz RU, in a PSDU type, and then may perform transmission only in available 40 MHz bands including P40 according to a CCA result immediately before transmission. Here, the type of the RU prepared for each 40 MHz band should be an individual 40 MHz RU type other than a 40 MHz RU within 160 MHz RU allocation of 11ax. This is due to the same reason as that mentioned above. A 160 MHz RU corresponds to a form in which the 80 MHz RU of FIG. 11(c) is repeated for each 80 MHz channel. In comparison of FIG. 11(b) and FIG. 11(c), in a case of (a) in which 40 MHz RU allocation is defined within the total 40 MHz band, guard carriers are located on the left and right of 484 carriers, whereas, in a case of (c) in which 40 MHz RU allocation is defined within the total 80 MHz band, transmission is performed with no guard carrier on the left and right of 484 carriers.

The modes of BW=15 to 19 are BW modes of the PPDU, in which channels, which remain after excluding busy channels from among sub-channels remaining after excluding 80 MHz channels including a main 20 MHz channel in the total 320 MHz channel bandwidth, are combined to perform transmission. In the case of BW=15 and 16, a channel finally transmitted and occupied is 160 MHz, and in the case of BW=17 to 19, 240 MHz is occupied. In order to perform preamble puncturing of the SU PPDU in the bandwidth of up to 320 MHz as described above, a transmitter may prepare A-MPDU, which is data to be transmitted for each 80 MHz RU, in a PSDU type, and then may perform transmission only in available 80 MHz bands including P80 according to a CCA result immediately before transmission. Here, a type of the RU prepared for each 80 MHz band is in a form of 996 carriers corresponding to 80 MHz RUs in FIG. 11(c).

Figure 12:
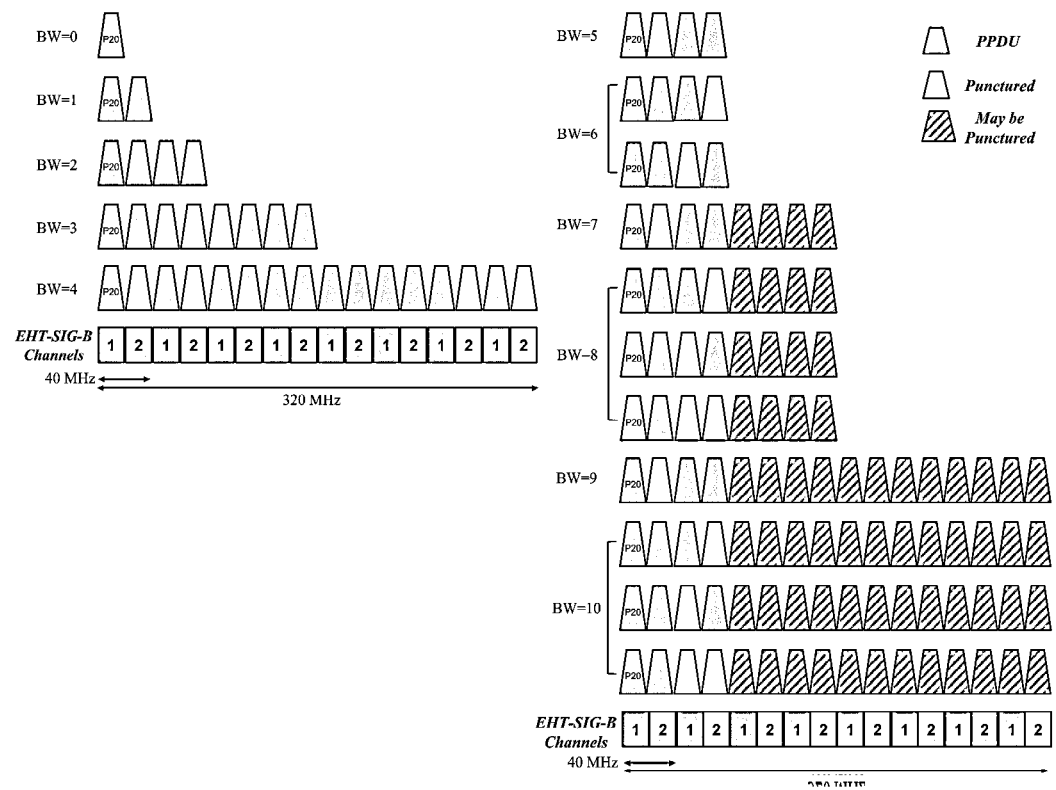
FIG. 12 illustrates an example of BW modes of an EHT MU PPDU.

FIG. 12 illustrates an example of BW modes of an EHT MU PPDU.

Modes from BW=0 to BW=4 correspond to embodiments in which a PPDU is transmitted by combining continuous channels without preamble puncturing, and are the same as those for an SU PPDU. In this case, as described above, a BW indicator indicating a bandwidth for transmission of the PPDU may be transmitted to an STA via a BW field included in U-SIG field.

Modes of BW=5 and 6 are BW modes of the PPDU, in which channels, which remain after excluding busy channels from among 20 MHz sub-channels remaining after excluding a main 20 MHz channel in the total 80 MHz channel bandwidth, are combined to perform transmission. Two puncturing modes are possible as in the mode of BW=6, which is because, after signaling of the BW field of U-SIG field, it is possible to signal which 20 MHz sub-channel has been actually punctured via an RU assignment field in a common field of an SIG-B field. Since this has an additional signaling field, such as the SIG-B field, it is advantageous that the BW field of the U-SIG field in an MU PPDU is able to signal only an approximate BW mode.

Modes of BW=7 and 8 are BW modes of the PPDU, in which channels, which remain after excluding busy channels from among 20 MHz sub-channels remaining after excluding a main 20 MHz channel in the total 160 MHz channel bandwidth, are combined to perform transmission. Three puncturing modes are possible as in the mode of BW=8, which is because, as mentioned above, classification is possible via additional signaling of the SIG-B field.

Modes of BW=9 and 10 are BW modes of the PPDU, in which channels, which remain after excluding busy channels from among 20 MHz sub-channels remaining after excluding a main 20 MHz channel in the total 320 MHz channel bandwidth, are combined to perform transmission. Three puncturing modes are possible as in the mode of BW=10, which is because, as mentioned above, classification is possible via signaling of SIG-B.

Figure 13:
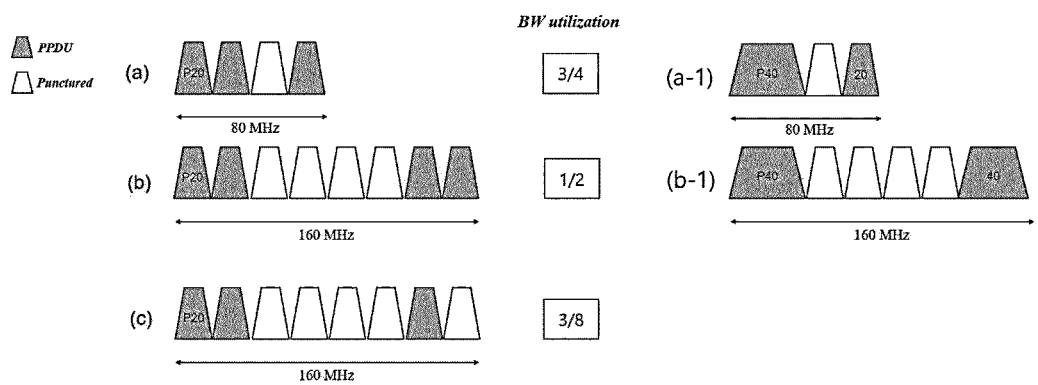
FIG. 13 illustrates an example of a discontinuous channel type based on a BW use rate rule according to an embodiment of the present invention.

FIG. 13 illustrates an example of a discontinuous channel type based on a BW use rate rule according to an embodiment of the present invention.

Referring to FIG. 13, a ratio of a bandwidth, which is used after preamble puncturing has been applied, to the total bandwidth, which is indicated by a bandwidth field included in a U-SIG field, should be equal to or greater than a certain ratio. That is, even if preamble puncturing is applied, a bandwidth of a certain ratio in the total bandwidth should be used for transmission of a PPDU.

For example, FIG. 13(a) is a discontinuous channel type allowed for PPDU transmission with a bandwidth of 80 Mhz, and FIG. 13(b) is a discontinuous channel type allowed for PPDU transmission with a bandwidth of 160 Mhz. When 50% or more of the bandwidth needs to be used, if preamble puncturing is applied in FIG. 13(a), the bandwidth of 60 MHz obtained by excluding punctured 20 MHz from the total 80 MHz bandwidth may be used, and if preamble puncturing is applied in FIG. 13(b), a bandwidth of 80 MHz obtained by excluding 80 MHz may be used. ¾ (75%) of the bandwidth is used after puncturing in FIGS. 13(a), and ½ (50%) of the bandwidth is used after puncturing in FIG. 13(b), so that a minimum bandwidth use ratio may be satisfied.

However, in a case of FIG. 13(c), the punctured bandwidth is 100 MHz of the total 160 MHz bandwidth, and thus the available bandwidth after puncturing is less than 50%. Therefore, FIG. 13(c) is a discontinuous channel type that is not allowed.

FIG. 13(a-1) and FIG. 13(b-1) are embodiments in which a continuous 40 MHz channel is used as one RU in FIG. 13(a) and FIG. 13(b), respectively. Even in such cases, regardless of an encoding method of an RU, the 50% or more bandwidth in the total bandwidth is available after puncturing, as shown in FIG. 13(a) and FIG. 13(b), so that the cases correspond to an allowable discontinuous channel type.

Figure 14:
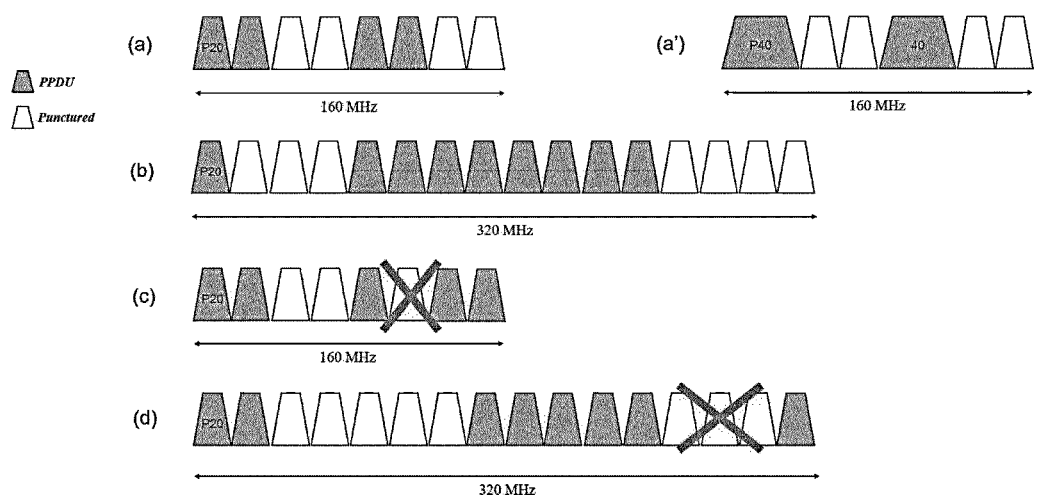
FIG. 14 illustrates an example of a discontinuous channel type based on a puncturing resolution according to an embodiment of the present invention.

FIG. 14 illustrates an example of a discontinuous channel type based on a puncturing resolution according to an embodiment of the present invention.

Referring to FIG. 14, when puncturing is applied to a bandwidth for transmission of a PPDU, a puncturing resolution needs to be greater than or equal to a certain ratio of the total bandwidth. That is, when some channels of a bandwidth for transmission of an SU PPDU or MU PPDU are punctured, an AP may notify an STA of a pattern of punctured RUs via a specific field (e.g., a puncturing mode field, etc.) of a PPDU. However, if punctured within the bandwidth, a resolution of puncturing should be greater than or equal to a certain ratio of the total bandwidth.

For example, a single puncturing BW or a puncturing resolution should be a certain ratio (e.g., ¼) of the total BW or greater. A reason for configuring limitation on the puncturing resolution is to normalize discontinuous channel types that increase as the BW becomes wider. As a result, as shown in embodiments of the present invention (FIG. 17 to FIG. 19), which will be described below, a channel type of the total bandwidth may be expressed by signaling discontinuous channel types regardless of the BW. Further, a puncturing BW adjacent to a primary channel in the total bandwidth may be calculated such that primary 20 MHz is included.

FIG. 14(a) and FIG. 14(a') illustrate an allowable discontinuous channel when the total bandwidth is 160 MHz. The total BW is 160 MHz, and single puncturing may thus be applied in a unit of at least 40 MHz. FIG. 14(b) is an embodiment of a case where the total bandwidth is 320 MHz. The total bandwidth is 320 MHz, and single puncturing may thus be applied in a unit of at least 80 MHz. However, if puncturing is performed in a primary channel, there may be a case in which a resolution regulation cannot be observed due to puncturing restrictions for primary 20 MHz. For example, if 80 MHz puncturing is performed at primary 80 MHz, it is possible to puncture only secondary 20 MHz and secondary 40 MHz excluding primary 20 MHz. Therefore, if puncturing is performed in a section continuous to P20, a BW including primary 20 MHz may be considered as a puncturing BW. For example, if only secondary 20 MHz is punctured for 160 MHz, it may be considered that 40 MHz including primary 20 MHz has been punctured. Therefore, as in an embodiment of the present invention, even when ¼ of the BW is configured for a puncturing resolution, a discontinuous channel type, in which only secondary 20 MHz is punctured for the total 160 MHz, is allowed (e.g., mode 7 of FIG. 15). The embodiment of FIG. 14(c) shows a discontinuous channel type of a 160 MHz BW, in which puncturing of some channels is performed in a unit of 20 MHz, and thus shows a discontinuous channel type that is not allowed in puncturing BW criteria. That is, if the total bandwidth is configured to 160 MHz in FIG. 14(c), puncturing may be restricted to be performed in a unit of 40 MHz bandwidth. However, in FIG. 14(c), a 20 MHz channel is punctured so that a discontinuous channel type does not satisfy the puncturing BW criteria. Therefore, such puncturing may not be allowed.

FIG. 14(d) also cannot be used because FIG. 14(d) corresponds to a discontinuous channel type in which puncturing is performed in a unit of 60 MHz, which is not allowed for the total 320 MHz BW.

Figure 15:
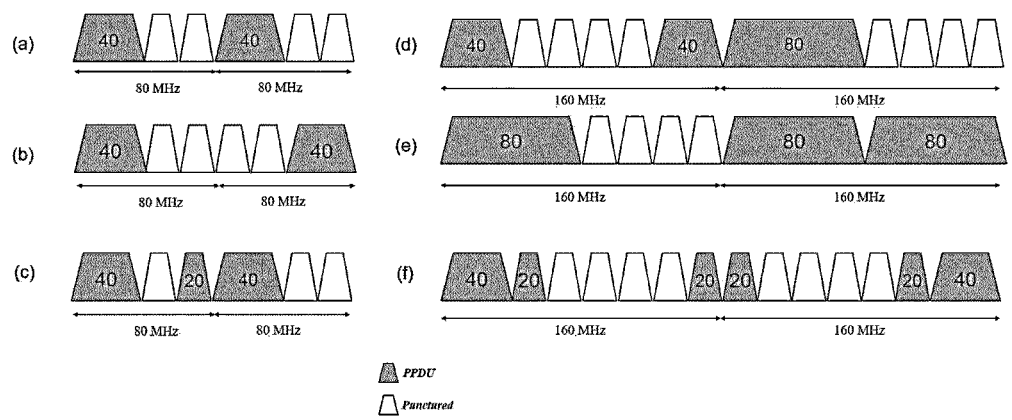
FIG. 15 illustrates an example of a discontinuous channel type based on the number of RUs to be decoded according to an embodiment of the present invention.

FIG. 15 illustrates an example of a discontinuous channel type based on the number of RUs to be decoded according to an embodiment of the present invention.

Referring to FIG. 15, on the basis of the total bandwidth via which a PPDU is transmitted, punctured bandwidths and/or patterns may be restricted.

Specifically, FIG. 15 shows an applicable discontinuous channel type when continuous 20 MHz channels are encoded to a 40 MHz or 80 MHz RU. When continuous 20 MHz channels are used as a 40 MHz or 80 MHz RU, the total number of discontinuous RUs decreases, so that a decoding burden on a reception side of the discontinuous channel is reduced. As illustrated on FIG. 11, in consideration of 20 MHz, 40 MHz, and 80 MHz RU allocation distribution diagrams, each RU configures guard carriers at both ends to avoid interference from adjacent channels, and if a 20 MHz channel is used as each RU as shown in FIG. 13(a), all information of 20 MHz RUs is independently decoded. Therefore, a reception device needs to decode individual 20 MHz in the BW separately, and thus has a burden to decode up to 16 individual RUs for the 320 MHz BW. In order to reduce such a decoding burden, after a discontinuous channel type is determined, a transmission device may combine continuous 20 MHz channels and encode the same to a larger RU of a 40 or 80 MHz unit, in which case, there is an effect of reducing the number of individual RUs that the reception device needs to concurrently decode.

The same effect may be achieved when a technique for reducing the decoding burden (using parsing, de-interleaving, etc.) is applied by integrating and decoding individual 20 MHz RUs without using RUs for a bandwidth of 40 MHz or 80 MHz.

The embodiment of FIG. 15 illustrates a technique for limiting the number of RUs required to be individually decoded in order to reduce the decoding burden on the reception device, and the number of RUs applied in the embodiment is limited to two. According to an embodiment, the number of RUs in a specific bandwidth unit may be limited. More specifically, the number of RUs in a 160 MHz unit (or a unit of 160 MHz or lower) may be limited to two. In the embodiment, it is assumed that a transmission device uses 40 MHz and 80 MHz RUs. However, limitation of the number is also applicable when the number of decoding RUs is reduced by combining 20 MHz RUs during an encoding procedure. Also, it is assumed that a 160 MHz RU includes two 80 MHz RUs, and 320 MHz includes two 160 MHz.

FIG. 15(a) and FIG. 15(b) correspond to an available discontinuous channel type in that a discontinuous channel type may include two 40 MHz RUs after a 160 MHz BW is punctured, and in a case of FIG. 15(c), an available discontinuous channel type is not applicable because a discontinuous channel has a total of three RUs which are two 40 MHz RUs and one 20 MHz RUs.

Each of FIG. 15(d) and FIG. 15E includes three RUs after the 320 MHz BW is punctured. According to the regulation of the number of RUs, two RUs or less should be included. However, a 320 MHz operation of EHT is physically configured by 160 MHz+160 MHz, so that an available discontinuous channel type may be assumed, wherein a condition of two RUs within the 160 MHz BW is satisfied. On the other hand, in FIG. 10F, as shown in FIG. 10(d), 40 MHz has been punctured in both two 160 MHz constituting a 320 MHz BW, but each 160 MHz may include two 20 MHz RUs and one 40 MHz RU after puncturing. Therefore, FIG. 15F and FIG. 15(d) are discontinuous channel types that are not allowed.

Figure 16:
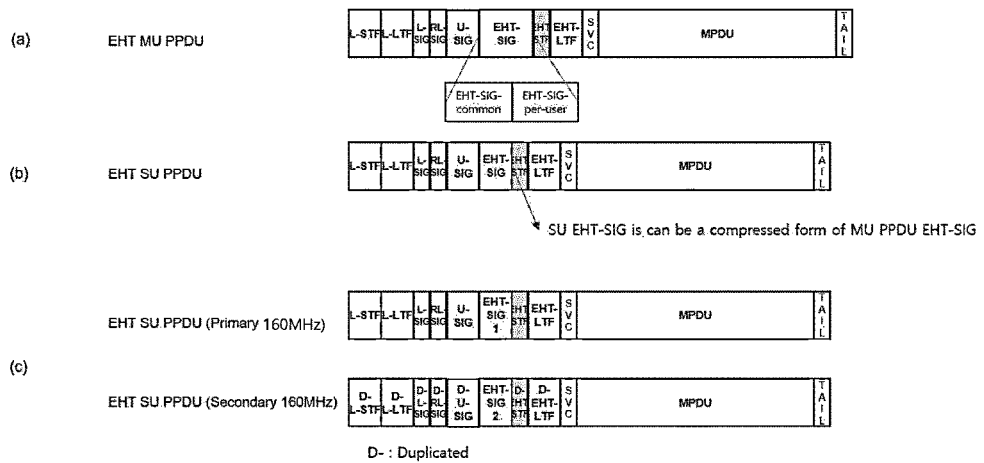
FIG. 16 illustrates an example of a PPDU format in a discontinuous channel according to an embodiment of the present invention.

FIG. 16 illustrates an example of a PPDU format in discontinuous channels according to an embodiment of the present invention.

Referring to FIG. 16, illustrated is a discontinuous channel type segmentation signaling technique applicable to basic formats of an EHT PPDU and an EHT SU PPDU and an EHT SU PPDU of a BW exceeding 160 MHz.

FIG. 16(a) illustrates an MU PPDU format for multi-user transmission of EHT. As illustrated in FIG. 16(a), an MU PPDU has a structure in which an EHT-SIG field is signaled after a U-SIG field is signaled. The EHT-SIG field of the MU PPDU may include a common field and a user field (per-user), and the common field of the EHT-SIG field may include Number of LTFs, GI+LTF size, RU allocation, a puncturing mode, and/or the like.

Number of LTFs: a field indicating the number of symbols constituting a long training field of EHT GI+LTF size: indicating guard-interval (GI) duration and EHT-LTF size information RU allocation: RU configuration information for the total bandwidth for transmission/reception of PPDU Puncturing mode: indicating whether to apply a puncture mode and/or a punctured RU The user field may include STA_ID, MCS, coding, and NSTS. FIG. 16(b) illustrates an SU PPDU format for single user transmission of EHT. As shown in FIG. 16(b), an EHT-SIG field of an SU PPDU may be configured in a form in which some contents/field contents of the MU PPDU have been changed or deleted. In a typical 320 MHz PPDU, a preamble appears repeatedly in the total 320 MHz as shown in FIG. 16(b). However, in the present invention, for an SU PPDU, an EHT-SIG field different from that of primary 160 MHz may be signaled for secondary 160 MHz, as shown in FIG. 16(c). That is, an EHT-SIG1 field of primary 160 MHz signals a puncturing mode of a primary 160 MHz BW, and an EHT-SIG2 field of secondary 160 MHz signals a puncturing mode of a secondary 160 MHz BW, separately. In other words, in secondary 160 MHz and primary 20 MHz, the EHT-SIG is transmitted individually without being duplicated except for a duplicated field, and thus the puncturing modes indicated by secondary 160 MHz and primary 20 MHz may be different. Here, the SU PPDU transmitted at primary 20 MHz may be repeatedly transmitted up to 4 times (up to 160 MHz).

In other words, if the total bandwidth is segmented into primary and secondary, an EHT-SIG field of each PPDU transmitted from each segment, primary and secondary, may include different information.

Specifically, the EHT-SIG field of primary 160 MHz may include contents different from those of the EHT field of secondary 160 MHz. That is, if the total bandwidth for PPDU transmission is divided into two or more segments, contents included in the EHT field, which are transmitted from each segment, may be different. In each segment, at least one field included in the EHT-SIG field may be duplicated and repeated in each predetermined band. For example, if the bandwidth of each segment is 80 MHz, at least one field included in a U-SIG field and/or an EHT-SIG field may include the same contents every 20 MHz. That is, if the PPDU is transmitted over a 320 MHz band, and 320 MHz is segmented into primary 160 MHz (first segment) and secondary 160 MHz (second segment) respectively, a preamble (including an EHT-SIG field) of the PPDU may be configured to have different contents in each of primary 160 MHz and secondary 160 MHz.

In other words, the EHT-SIG field may include one or more content channels, one or more fields corresponding to each other in the same segment (primary 20 MHz or secondary 160 MHz) may be configured to have the same value in each content channel, and one or more fields corresponding to each other between different segments may be configured to have different values.

For example, if the EHT-SIG field includes a first content channel and a second content channel, at least one of the same fields between the first content channel and the second content channel within the same segment among at least one segment may include the same information. In this case, a resource unit allocation (RU allocation) field, which is information related to a configuration of the resource unit, may be configured to a different value according to the content channels.

If the first content channel and the second content channel include a specific field, a value of the specific field may be configured identically in the same segment, but may be configured differently in different segments.

For example, if the first content channel and second content channel transmitted in the first segment include a first common field including at least one field including the same value, and the first content channel and second content channel transmitted in the second segment include a second common field including at least one field including the same value, the at least one field included in the first common field and the at least one field included in the second common field may include different information. The at least one field included in the first common field and the at least one field included in the second common field are of the same type.

The EHT-SIG field may include at least one content channel, and each content channel may include at least one of a common field, a resource unit allocation field, or a user specific field, which have been described above. The resource unit allocation field may be included in the common field.

Since a value/information of a field transmitted in each segment is different, a reception device should receive both the EHT-SIG1 field for primary 160 MHz and the EHT-SIG2 field for secondary 160 MHz. Accordingly, the reception device needs to know in advance a channel (not punctured) capable of receiving a preamble in the secondary 160 MHz bandwidth. To this end, information on a channel capable of receiving the EHT-SIG2 field needs to be signaled to the reception device in advance, and may be signaled in a BW field of the U-SIG field or a field appearing after the BW field (a preamble of primary 160 MHz is received via primary 20 MHz).

If the proposed signaling technique of secondary 160 MHz is not applied, 160 MHz signaling (160 MHz discontinuous channel type information) to be described below may appear twice within the EHT-SIG in order to signal a puncturing mode of a BW exceeding 160 MHz.

FIG. 17 illustrates an example of discontinuous channels segmented according to frequency segmentation according to an embodiment of the present invention.

FIG. 17 illustrates discontinuous channel types and signaling schemes of an allowable 80 MHz bandwidth when a restriction on a discontinuous channel type is applied.

As illustrated in FIG. 17, Mode 0 is a continuous channel type in which puncturing is not applied to an 80 MHz bandwidth and all BWs are used. Mode 1 corresponds to a discontinuous channel type in which only secondary 20 MHz of the 80 MHz bandwidth is punctured, wherein a location to be punctured may vary as in two cases of Mode 1 (left and right inversion is possible) depending on a location of primary 20 MHz in the 80 MHz bandwidth. Since a reception device knows locations of primary 20 MHz, secondary 20 MHz, and secondary 40 MHz, a discontinuous type of the 80 MHz BW may be identified by Mode1 signaling which indicates that secondary 20 MHz has been punctured.

Modes 2 and 3 may signal a discontinuous channel type in which one 20 MHz sub-channel of secondary 40 MHz is punctured. For example, an AP may include, in U-SIG or EHT-SIG, the punctured discontinuous channel type in a bitmap format, and transmit the same to the reception device.

Two modes are needed to distinguish punctured 20 MHz of secondary 40 MHz. Modes 4 and 5 signal a discontinuous channel type in which secondary 20 MHz and one 20 MHz of secondary 4 MHz are punctured, and two modes are allocated to distinguish 20 MHz that is punctured together with secondary 20 MHz of secondary 40 MHz.

FIG. 18 illustrates an example of discontinuous channels for single user transmission according to an embodiment of the present invention.

Referring to FIG. 18, if the total bandwidth is 160 MHz, a discontinuous channel type may be allowed via puncturing by punctured channels.

Specifically, if the discontinuous channel type regulation technique is applied, the allowed discontinuous channel types of a 160 MHz BW may be the same as those of mode 0 to mode 5 in FIG. 18. For example, Mode 0 is a continuous channel type in which puncturing is not applied in the 160 MHz bandwidth and the total bandwidth is used. Mode 1 corresponds to a discontinuous channel type in which only secondary 40 MHz of the 160 MHz bandwidth is punctured, and may vary as in two cases of Mode 1 (left and right inversion is possible) depending on a location of primary 20 MHz in the 160 MHz bandwidth. Since a reception device knows locations of primary 20 MHz, secondary 20 MHz, secondary 40 MHz, and secondary 80 MHz, a discontinuous type of the 160 MHz BW may be identified by Mode 1 signaling which indicates that secondary 40 MHz has been punctured. Modes 2 and 3 signal a discontinuous channel type in which one 40 MHz sub-channel of secondary 80 MHz is punctured, and two modes are required to distinguish punctured 40 MHz of secondary 80 MHz. Modes 4 and 5 signal a discontinuous channel type in which secondary 40 MHz and one 40 MHz of secondary 80 MHz are punctured, and two modes have allocated to distinguish 40 MHz that is punctured together with secondary 40 MHz of secondary 80 MHz.

Accordingly, puncturing modes 0 to 5 signal the same discontinuous channel type differing only in the total bandwidths of 80 MHz and 160 MHz, and may be thus expressed as the same signaling. The reception device may identify the total bandwidth and a discontinuous channel type by combining mode information and a BW field value (80 MHz, 160 MHz, 240 MHz, or 320 MHz).

FIG. 19 illustrates an example of discontinuous channels for a specific bandwidth according to an embodiment of the present invention.

Referring to FIG. 19, if the total bandwidth for PPDU transmission is 160 MHz or higher, a discontinuous channel may be configured in a specific type.

As illustrated in FIG. 19, mode 6 represents a discontinuous channel type in which secondary 20 MHz and secondary 40 MHz are punctured. Mode 7 refers to a discontinuous channel type in which only secondary 20 MHz is punctured in a 160 MHz BW.

The discontinuous channel types from mode 0 to mode 7 are signaled using 3 bits, and signaling for BWs (80+160, 160+80, and 160+160) exceeding 160 MHz is performed by signaling puncturing modes for primary 80 MHz or 160 MHz and secondary 80 or 160 MHz, respectively, as described in FIG. 16. That is, at least one field of a PPDU transmitted in each segmented bandwidth may include different information/contents. In other words, a U-SIG field and/or an EHT-SIG field transmitted in each segment may indicate different values in the same field. For example, the PPDU transmitted in each segment may include a specific field including an indicator for indicating a puncturing pattern related to each different puncturing mode. A puncturing pattern may indicate punctured channels in a bitmap format according to a puncturing mode.

Figure 20:
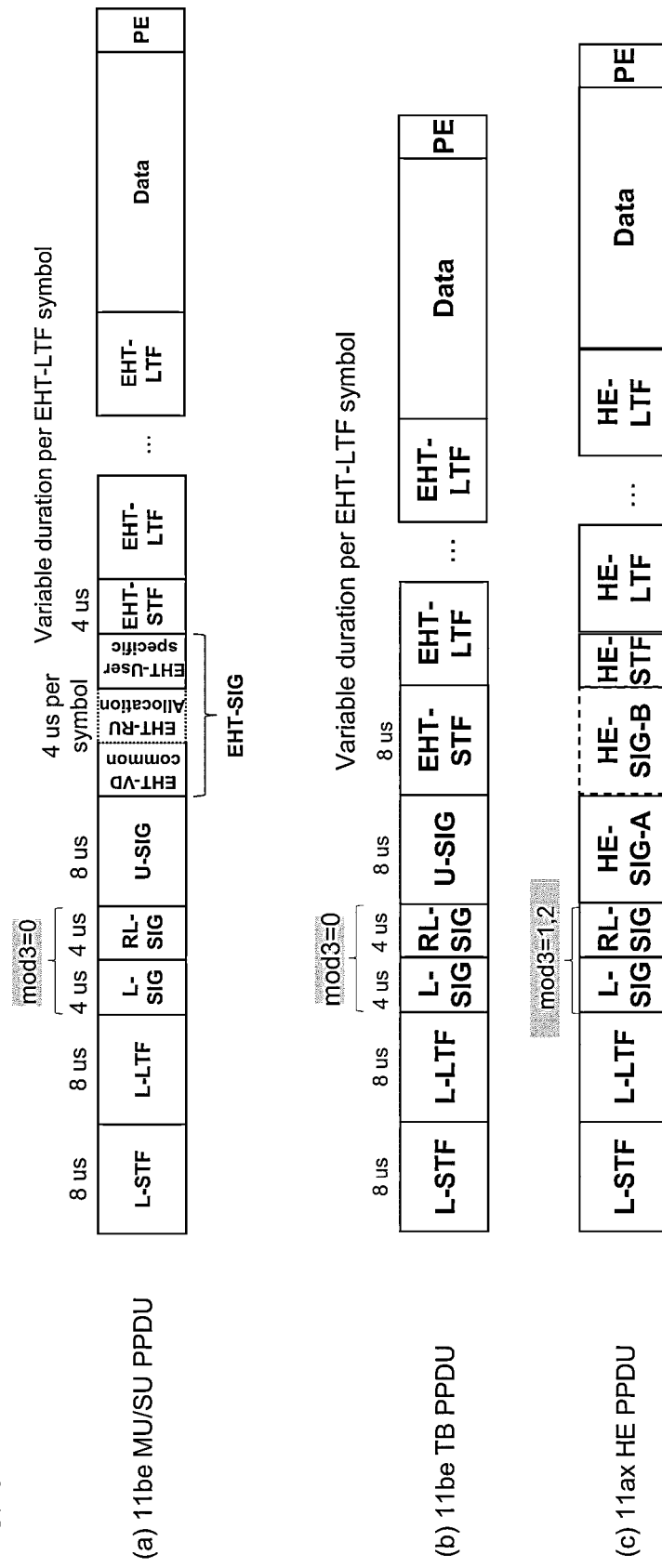
FIG. 20 illustrates an example of a PPDU format of an extremely high throughput (EHT) wireless LAN according to an embodiment of the present invention.

FIG. 20 illustrates an example of a PPDU format of an extremely high throughput (EHT) wireless LAN according to an embodiment of the present invention.

Referring to FIG. 20, a configuration of fields included in a PPDU of an EHT WLAN may be different depending on a type of the PPDU, the number of terminals to which the PPDU is transmitted, and whether OFDMA is applied.

Specifically, in relation to FIG. 20(a), FIG. 7(a) illustrates an embodiment of a PPDU format for single/multi-user transmission, and FIG. 7(b) illustrates an embodiment of a trigger based (TB) PPDU format which is a PPDU initiated by a trigger frame. FIG. 7(c) illustrates an embodiment of an HE PPDU format based on 802.11ax.

Referring to FIG. 7(a), an SU/MU PPDU for single/multi-user transmission may include a legacy short training field (L-STF), a legacy long training field (L-LTF), and a legacy signal field (L-SIG), and a repeated legacy signal field (RL-SIG). The four fields mentioned above are legacy fields included also in the 11ax PPDU format of FIG. 7(c).

A U-SIG field is a field newly introduced in 11be that is an EHT communication standard, and is a field to be commonly included in a subsequent generation 802.11 standard PPDU including 11be. The universal SIG (U-SIG) field may be continuously included in an EHT PPDU and a subsequent generation WLAN PPDU, and serves to classify a generation of PPDU including 11be. The U-SIG field may include two OFDM symbols based on 64FFT, and may transfer a total of 52 bits of information. Interpretation of some fields included in the U-SIG field may vary depending on a PPDU type, whether multi-user transmission is performed, and whether OFDMA transmission is performed, and this will be described in detail with reference to the embodiment of FIG. 22.

For example, configurations of fields included EHT-SIG fields may vary according to at least one field value included in the U-SIG field of the SU/MU PPDU.

The EHT-SIG field is functionally divided into an EHT-VD common field, an EHT-RU allocation field, and an EHT-user specific field, and interpretation of some fields may vary or may be omitted depending on a PPDU type, whether multi-user transmission is performed, and whether OFDMA transmission is performed. For example, if a field value included in the U-SIG field indicates that OFDMA is not applied or indicates single user transmission, a field for allocating a resource unit may be omitted so as not to be included in the EHT-SIG field.

Integration of the EHT-VD common field and the EHT-RU allocation field may be referred to as an EHT-common field. A configuration and modification (compression or omission) type of the EHT-SIG field will be described in detail via an embodiment of FIG. 22.

Referring to FIG. 7(b), a TB PPDU of EHT transmitted in response to a trigger frame may include only the U-SIG field after the legacy field, and the EHT-SIG field may not be included. Therefore, unlike MU/SU PPDUs in which information for decoding the EHT-SIG field is included in the U-SIG field, information for decoding the EHT-SIG field may not be included in the U-SIG field. The TB PPDU may be signaled including a spatial reuse field, puncturing mode information indicating whether the above-described RUs constituting a transmission bandwidth are punctured, and the like. The U-SIG configuration of the TB PPDU of FIG. 20(c) and a method of distinguishing the TB PPDU from an SU/MU PPDU will be described in detail via an embodiment of FIG. 21.

Figure 21:
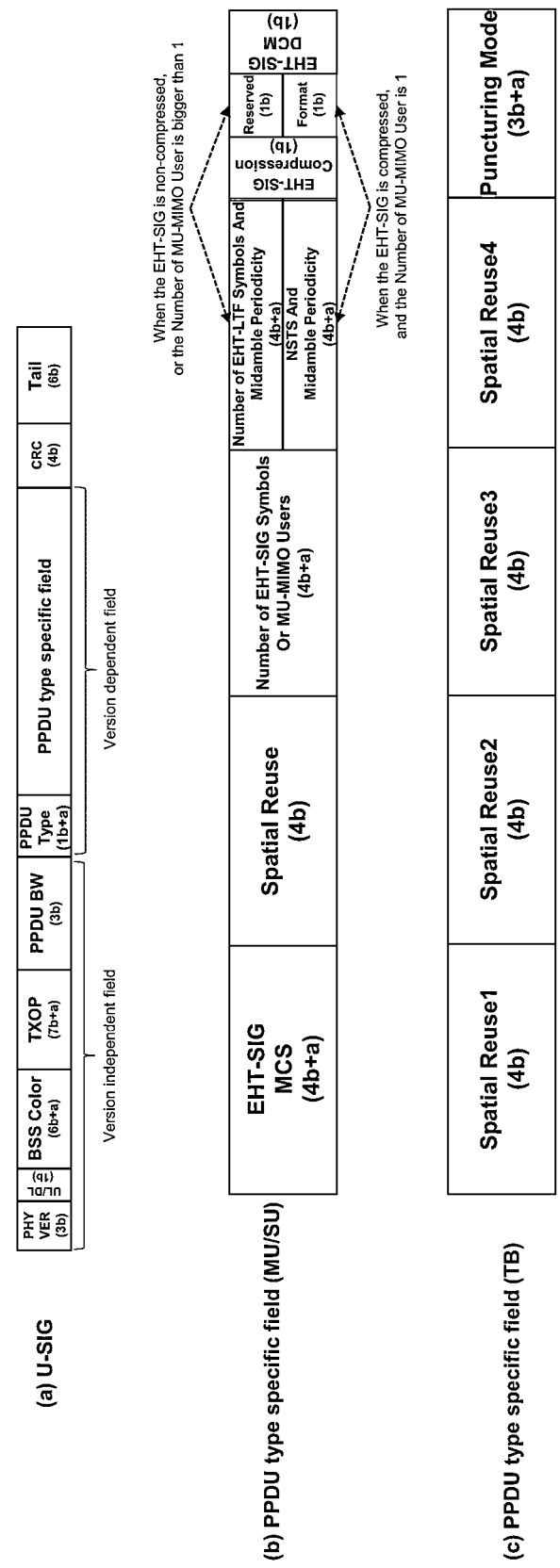
FIG. 21 illustrates an embodiment of a U-SIG field of an EHT PPDU and a field constituting the U-SIG field according to an embodiment of the present invention.

FIG. 21 illustrates an embodiment of a U-SIG field of an EHT PPDU and a field constituting the U-SIG field according to an embodiment of the present invention.

Referring to FIG. 21, a PPDU type may be classified based on a value of a specific field indicating the PPDU type included in a U-SIG field, and a configuration of an EHT-SIG field may vary according to values of fields included in the U-SIG field.

Specifically, FIG. 21(a) is an example of a format structure of a U-SIG field included in an EHT PPDU, and 43 bits excluding 9 bits of CRC/tail from among 52 bits of the U-SIG field are largely divided into a version independent (VI) field and a version dependent (VD) field. In information to be provided from the VD field, information having failed to be signaled due to a constraint on the number of bits may be signaled via EHT-SIG. That is, some of fields required to be included in the VD field may be included in the EHT-SIG field so as to be transmitted, and in this case, the fields required to be included in the VD field that is included in the EHT-SIG field may be repeatedly transmitted in each pre-determined frequency band.

A VI field enables a current bit configuration to be maintained even later on, so that even if a PPDU of a subsequent generation is defined, current 11be terminals may obtain information on the PPDU via the VI fields of the PPDU. To this end, the VI field includes version identifier, UL/DL, TXOP, BSS color, and PPDU BW fields. The version identifier field serves to classify 11be and subsequent generation wireless LAN standards. In a case of 11be, a value of the version identifier field may be signaled as 000b. The UL/DL field is used to identify whether the PPDU is an uplink/downlink PPDU. The TXOP field indicates transmit opportunity duration transmitted in a MAC header, wherein, by adding the TXOP field to a PHY header, the PPDU may infer a length of TXOP included therein without having to decode an MPDU, and 7 bits or more may be allocated.

The BSS color field indicates an identifier for each BSS to identify BSS defined in 11ax, and has a value of 6 bits or more. The PPDU BW field indicates a bandwidth occupied by the PPDU, and the indicated bandwidth may be a bandwidth value before preamble puncturing is applied. More than 3 bits may be allocated to the PPDU BW field, wherein, when 3 bits are allocated, 000b=20 MHz, 001b=40 MHz, 010b=80 MHz, 011b=160(80+80) MHz, 100b=240 (160+80, 80+160) MHz, and 101b=320(160+160) MHz may be signaled.

The remaining 110b and 111b may be used to signal a BW (>320 MHz) of a subsequent standard, and may be used in combination with a part of a VD field of the subsequent standard in order to signal the bandwidth of the subsequent standard.

The VD field is a field that may be changed during development of the subsequent standard, and may be changed during introduction of a new technology to each standard or improvement of signaling efficiency. A configuration of an 11be version of the VD field varies according to a PPDU type, and includes a field for signaling the PPDU type. Accordingly, the VD field may be divided into a PPDU type field and a PPDU type specific field, the configuration and interpretation of which vary according to the PPDU type field. The PPDU type field may be located before or after the PPDU type specific field, or may be located between fields constituting the PPDU type specific field. The present embodiment provides description by taking an example in which the PPDU type field is located before the PPDU type specific field.

In EHT, a PPDU type may be classified into an MU/SU PPDU and a TB PPDU, and the PPDU type field may be configured by 1 bit for this purpose. In this case, the PPDU type field may enable classification into an MU/SU PPDU and a TB PPDU. Alternatively, in order for individual classification into an MU PPDU, an SU PPDU, and a TB PPDU, the PPDU type field may include 2 bits or more. The present invention provides description by taking an example of a case in which the PPDU type field is 1 bit.

FIG. 21(b) illustrates an embodiment of a PPDU type specific field when a PPDU type field of a VD field indicates an MU/SU PPDU. An EHT-SIG MCS field is located after a U-SIG field and refers to an MCS applied to an EHT-SIG field, and 4 bits or more may be allocated. A spatial reuse field may be used to have the same meaning as that of the spatial reuse field of 11ax.

An EHT-SIG compression field indicates whether an EHT-RU allocation field, which indicates configurations of resource units constituting the total bandwidth via which the PPDU is transmitted, from among EHT-SIG fields is compressed (omitted), and 1 bit or 2 bits are allocated. In an embodiment, in a case of 1-bit, 0 may indicate that the EHT-RU allocation field is not compressed, and 1 may indicate that the EHT-RU allocation field is compressed so as not to be included in the EHT-SIG field.

If the EHT compression field is 2 bits, 00b may indicate that the EHT-RU allocation field is not compressed, 01b may indicate compression mode 1, and 10b may indicate compression mode 2, and so on. The EHT-SIG compression field signals whether a corresponding PPDU is an OFDMA MU PPDU to which OFDMA has been applied. In a case of an MU PPDU to which OFDMA has been applied, an RU needs to be allocated to each STA, and therefore an EHT-RU allocation field cannot be compressed. Accordingly, an STA may recognize whether a received PPDU is an MU PPDU to which OFDMA has been applied, by determining whether the EHT-RU allocation field is compressed, via an EHT-SIG compression field. If OFDMA is not applied, since RUs are configured by the same number of tones (or frequency bands) even in the case of the MU PPDU, it is not required to separately transmit an RU allocation field indicating a configuration of an RU to the STA. Therefore, in this case, the EHT-SIG compression field may indicate that the RU allocation field is not included in the EHT-SIG field.

In a Number Of EHT-SIG Symbols Or MU-MIMO Users field, four or more bits are allocated, and a length of an EHT-user specific field may be signaled so as to be used for decoding the EHT-user specific field. In the Number Of EHT-SIG Symbols Or MU-MIMO Users field, when the EHT-SIG compression field is not 0, that is, when the compression mode is applied, the number of MU-MIMO users (i.e., STA) is indicated, and if the EHT-SIG compression field is 0, that is, when the compression mode is not applied, the number of symbols constituting the EHT-SIG field is indicated. If the number of STAs or users of the MU-MIMO indicated by the field indicates 1, this indicates that the PPDU is an SU PPDU.

Information indicated by bits allocated to two different fields overlapping each other is determined according to whether the PPDU is an SU PPDU, wherein the two different overlapping fields are a Number of EHT-LTF Symbols And Midamble Periodicity field and an NSTS And Midamble Periodicity field.

That is, depending on the PPDU type, each of the Number of EHT-LTF Symbols And Midamble Periodicity field or the NSTS And Midamble Periodicity field may be included. In an embodiment of 1 bit, if the value of the EHT-SIG compression field is 1 and the number of MU-MIMO users is 1, a reception device recognizes the received PPDU as an SU PPDU, and recognizes that the bits indicate the NSTS And Midamble Periodicity field. If the EHT-SIG compression field is 0, or if neither the value of the Number Of EHT-SIG Symbols Or MU-MIMO field indicates 1 symbol nor the number of MU-MIMO users is 1, the reception device recognizes the received PPDU as an MU PPDU, and recognizes that the bits indicate the Number of EHT-LTF Symbols And Midamble Periodicity field.

FIG. 21(c) illustrates an example of a format of a PPDU type specific field when a PPDU type field of a VD field indicates that a received PPDU is a TB PPDU. The TB PPDU includes only a spatial reuse field and a puncturing mode field.

The spatial reuse field may be interpreted with a value of a bandwidth field, and signals a band, in which spatial reuse is possible, in the total bandwidth indicated by the bandwidth field and a transmit power limit of a case where spatial reuse is applied. If the BW field indicates 20 MHz, the spatial reuse field signals the transmit power limit and whether spatial reuse of a corresponding band is possible. If the bandwidth field indicates 40 MHz, a spatial reuse 1 field signals the transmit power limit and whether spatial reuse is possible for first 20 MHz, and a spatial reuse 2 field signals the transmit power limit and whether spatial reuse is possible for second 20 MHz.

If the bandwidth field indicates 80 MHz, 160 MHz, 240 MHz, and 320 MHz, spatial reuse 1, 2, 3, and 4 fields signal the transmit power limit and whether spatial reuse is possible for ¼ (40 MHz for 160 MHz, and 80 MHz for 320 MHz) of respective bandwidths.

The puncturing mode field signals puncturing modes to be generated when uplink MU OFDMA is performed to the TB PPDU, and an STA and an AP of an adjacent BSS may obtain additional information required for spatial reuse via puncturing mode information of an UL PPDU received by the STA and the AP themselves. A PPDU type (final type received by the AP) combined with UL MU OFDMA transmission may differ from a type signaled in a puncturing mode of the TB PPDU because actual uplink transmission does not occur in some bandwidths according to CCA results of UL STAs.

Figure 22:
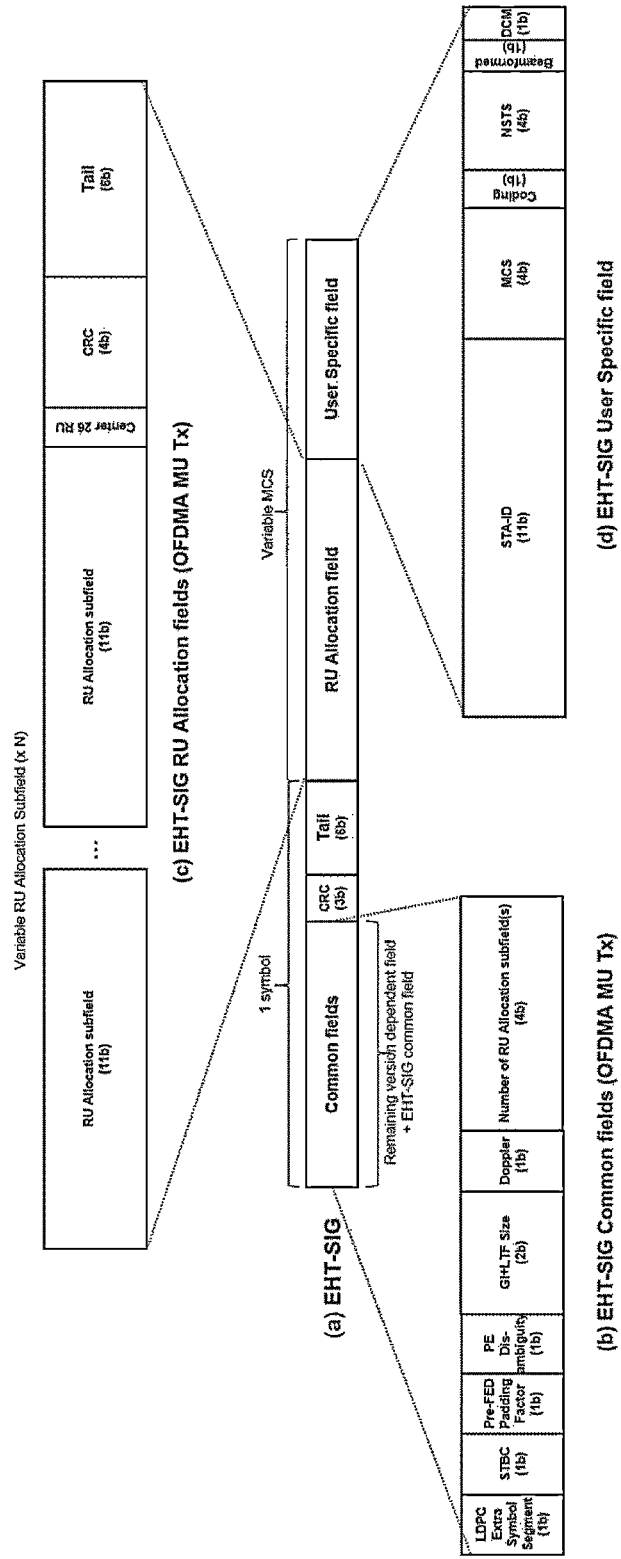
FIG. 22 illustrates an embodiment of an uncompressed type EHT-SIG according to an embodiment of the present invention.

FIG. 22 illustrates an embodiment of an uncompressed type EHT-SIG according to an embodiment of the present invention.

EHT-SIG of FIG. 22(a) is used for an OFDMA MU PPDU, and includes a common field, an RU allocation field, and a user specific field. Each field name in an EHT-SIG field may vary and may not specify classification of a field.

FIG. 22(b) illustrates an example of a format of a common field included in the EHT-SIG field. The common field may include at least one field that cannot be included due to a bit size limitation of a VD field of a U-SIG field. For example, the common field may include the same field as a field shown in an HE-SIG-A field of 11ax, such as LDPC extra symbol segment, STBC, pre-FED padding factor, GI-LTF size, and/or Doppler fields, or a field having the same function thereof, and bits equal to or greater than those of the same field of 11ax may be allocated. The EHT-SIG common field may include one symbol and, to this end, 26 bits may be allocated, and the EHT-SIG common field may be coded with MCS 0.

Number of RU Allocation field(s) may signal the Number of RU Allocation fields present in an EHT-SIG RU allocation field of FIG. 22(c), and may include 4 bits or 3 bits. Unlike 11ax, the Number of RU Allocation field is necessary because an RU allocation subfield of 11be does not appear as a fixed number according to a bandwidth.

In a case of 11ax, if a PPDU bandwidth is 40 MHz or lower, one RU allocation field appears in each of content channels 1 and 2, if the PPDU bandwidth is 80 MHz, two RU allocation fields appear in each of content channels 1 and 2, and if the PPDU bandwidth is 160 (80+80) MHz, four RU allocation fields appear in each of content channels 1 and 2. On the other hand, in the RU allocation field of 11be, in each content channel 1, a fixed number of RU allocation fields according to the PPDU bandwidth do not appear, and a flexible number of RU allocation fields according to an RU configuration and combination within the bandwidth may be included.

If 4 bits are allocated to the Number of RU Allocation field, in order to signal that there is one RU allocation field in EHT-SIG RU allocation fields, values of the Number of RU Allocation field(s) may be 0000 (=1-0). In an embodiment of 4 bits, in order to signal that there are 16 RU allocation fields in the EHT-SIG RU allocation field(s), values of the Number of RU Allocation field(s) may be 1111 (=16-1). The Number of RU Allocation field indicates the number of RU allocation fields of a content channel including the Number of RU Allocation field. Therefore, the Number of RU Allocation field may appear differently in each content channel when the number of RU allocation fields shown in different content channels is different.

FIG. 22(c) illustrates an example of a format of an EHT-SIG RU allocation field. An EHT-SIG RU allocation field appears only in an OFDMA MU PPDU, and may not appear, due to compression, in an EHT-SIG field of an SU PPDU, a TB PPDU, and a full BW MU-MIMO.

8 or more bits may be allocated to the RU allocation field. The EHT-SIG RU allocation field includes N RU allocation fields, and N may be indicated by a Number of RU Allocation field shown before the EHT-SIG RU allocation field. The N RU allocation fields may appear early in the EHT-SIG RU allocation field according to a sequence of including a lowest frequency RU among RUs included in each RU allocation field.

As an example of the sequence of fields shown in the RU allocation field, it is assumed that four RU allocation fields signal subfield #1=[−1012:−771 & −495:−254] (two 242-tone RUs), subfield #2=[−770:−529] (242-tone RU), subfield #3=[12:529 & 770:1012] (484-tone RU, 242-tone RU), and subfield #4=[−253:−12 & 529:770] (two 242-tone RUs). In this case, subfield #1 having the RU at −1012 appears first in the RU allocation field, subfield #2 having the RU at −770 appears second, subfield #4 having the RU at −253 that is a subsequently lower frequency appears third, and subfield #3 in which a lowest frequency of the RU is 12 may appear last in the RU allocation field.

The RU allocation field signals a small RU configuration within 20 MHz including RUs of 26, 52, and 106-tone sizes, and may include a 78(26+52 or 52+26)-tone RU that allocates, at once, RUs in which 26 and 52-tone RUs are shown continuously, and a 132(26+106 or 106+26)-tone RU that allocates, at once, RUs in which 26 and 106-tone RUs are shown continuously. The RU allocation subfield signals a large RU having a size of 242-tone or higher, and may signal a combination of RUs constituting each large RU and a positional relationship of the constituting RUs in order to signal the combination and positions of the large RUs located discontinuously. A method for RU configuration and allocation for signaling using an RU allocation subfield will be described with reference to an embodiment of FIG. 23. A center 26 RU field indicates whether 1, 2, and 4 center 26-tone RUs existing in 80 MHz, 160 MHz, and 320 MHz are used respectively, one or more bits may be allocated to the center 26 RU field, and if a PPDU BW is 40 MHz or lower, the center 26 RU field may not be shown due to compression. In an embodiment of bits, a center 26-tone RU field of an 80 MHz PPDU indicates whether a center 26-tone RU located in the middle of 80 MHz is used, and an identical value (for example, 1) is shown in center 26-tone RU fields of all EHT-SIG content channels. If the value of the center 26-tone RU field is 1, a field indicating an STA, to which a corresponding center 26-tone RU has been allocated, may be included in the EHT-SIG user specific field of FIG. 9(d). In an embodiment of 1 bit, a center 26-tone RU field of a 160 MHz PPDU is repeated for each of two EHT-SIG content channels, a center 26-tone RU field of content channel 1 indicates whether a center 26-tone RU of 80 MHz existing at a relatively low frequency is used, and a center 26-tone RU field of content channel 2 may indicate whether a center 26-tone RU of 80 MHz existing at a relatively high frequency is used. In an embodiment of 1 bit, if 4 channels are used for 240 MHz and 320 MHz PPDUs, center 26-tone RU fields existing in content channels 1, 2, 3 and 4 may indicate whether first, second, third, and fourth (ascending order of frequency) center 26-tone RUs are used, respectively.

In an embodiment of 2 bits, in order to signal whether four center 26-tone RUs existing in a 320 MHz PPDU are used, a 2-bit center 26-tone RU field may be shown in each of content channel 1 and content channel 2. The 2-bit center 26-tone RU field of content channel 1 may have a value, such as 00, 01, 10, 11, to signal whether the first and second center 26-tone RUs or the first and third center 26-tone RUs in ascending order of frequency are used. 2 bits of content channel 2 may indicate whether the third and fourth center 26-tone RUs or the second and fourth center 26-tone RUs are used. For example, if a 1-bit center 26-tone RU field is signaled as "1" (using), one EHT-SIG user specific field is shown to indicate an STA, to which a center 26-tone RU has been allocated, in a corresponding content channel. Alternatively, if a 2-bit center 26-tone RU field is signaled as "11", EHT-SIG user specific fields of two STAs, to which a center 26-tone RU has been allocated, are shown in corresponding content channels, respectively.

FIG. 9(d) illustrates an embodiment of an EHT-SIG user specific field. A basic function of the EHT-SIG user specific field may be used in the same way as an HE-SIG-B user specific field of 11ax, and each field included in the EHT-SIG user specific field may also be used in the same way as corresponding fields of 11ax. However, 4 bits are allocated to NSTS to signal 16 streams.

In addition to elements represented in the embodiment of FIG. 9(d), in order to signal one or more RUs as a single user-specific field, an additional RU indicator field may be included, wherein the additional RU indicator field is for the presence or absence of an additionally allocated RU other than the RU corresponding to the user-specific field. If the additional RU indicator field indicates that there exists an additional RU allocated to a reception device, the reception device checks a user-specific field located after the corresponding user-specific field so as to identify an additional RU allocated to STA-ID of the reception device.

Figure 23:
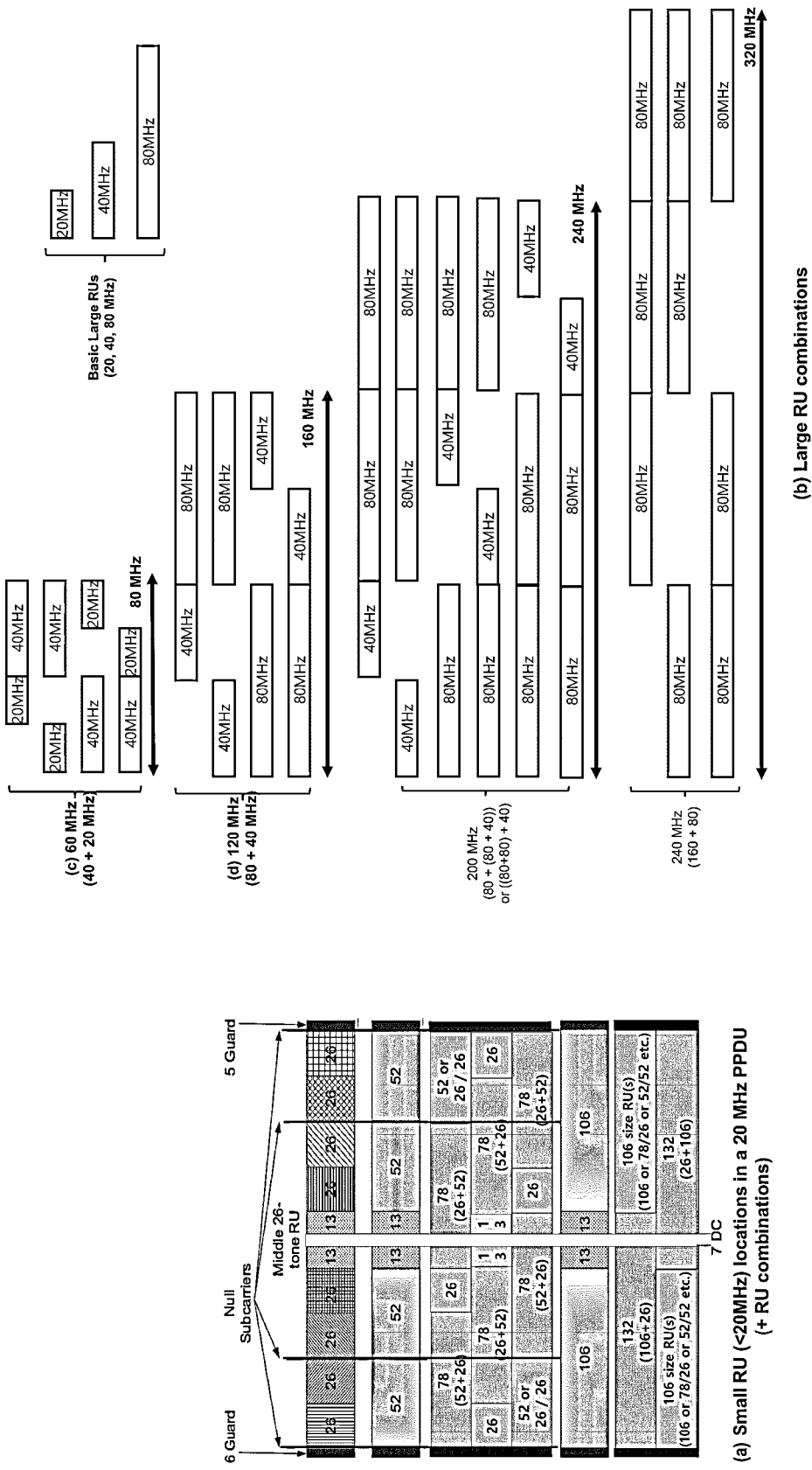
FIG. 23 illustrates an example of a resource unit configuration based on a field for allocating a resource unit according to an embodiment of the present invention.

FIG. 23 illustrates an example of a resource unit configuration based on a field for allocating a resource unit according to an embodiment of the present invention.

Referring to FIG. 23, a plurality of RUs may be allocated to a terminal, and the plurality of allocated RUs may have different numbers of tones or different frequency bands.

Specifically, FIG. 23(a) illustrates an example of an RU configuration within 20 MHz that may be indicated by an RU allocation field. In the embodiment, it is assumed that 26, 52, and 106-tone sizes correspond to basic small RUs, and a 78(26+52 or 52+26)-tone size RU, a 132(26+106 or 106+26)-tone size RU, and a 158(52+106 or 106+52)-tone size RU, which may be configured to be a combination of basic small RU, are defined as a small RU.

In an embodiment of allocation of small RUs existing within a 20 MHz band, RUs within the 20 MHz band may be signaled as 9 26-tone RUs, and the RUs may be allocated to 9 reception devices, respectively. In another embodiment, after signaling the 20 MHz band with a combination of a 26-tone RU and a 52-tone RU, each one of the 26-tone RU and the 52-tone RU may be allocated to a reception device, or the 26-tone RU and the 52-tone RU which are successively arranged may be allocated to a specific reception device at once. As another embodiment, after signaling the 20 MHz band with a combination of a 26-tone RU, a 52-tone RU, and a 106-tone RU, each one of the 26-tone RU, the 52-tone RU, and the 106-RU may be allocated to a reception device, or the 26-tone RU and the 106-tone RU which are successively arranged may be allocated to a specific reception device at once. In the embodiment, the 106-tone size RU or the successive 106+26-tone RU (or 26+106-tone RU) may be repeatedly allocated to one or more reception devices via an MU-MIMO. In the embodiment, in order to allocate a 78-tone RU and a 132-tone RU to the reception device, bit combinations indicating the 78-tone RU (26+52 or 52+26 type) and the 132-tone RU (26+106 or 106+26 type) are defined (included) in the RU allocation field, or after the 20 MHz band is signaled with the combination of the 26-tone RU, the 52-tone RU, and the 106-tone RU, two RUs may be allocated to the reception device by using a user specific field.

Alternatively, in order to allocate two basic small RUs to the reception device, signaling may be additionally performed in a user specific field of the reception device corresponding to a first basic RU according to ascending order of frequency, wherein the signaling is to determine whether a subsequent basic small RU located successively to the corresponding small RU is used (allocated). Alternatively, in order to signal whether the subsequent small RU that is successively located is used, the user specific field may include an additional RU field including 1 bit.

FIG. 23(b) illustrates configurations of RUs of 20 MHz or higher that may be indicated by an RU allocation field. In FIG. 23(b), a 242-tone RU, a 484-tone RU, a 996-tone, a 996×2-tone, a 996×3-tone, and a 996×4-tone RU may be defined as a basic large RU, and a 242+484-tone RU, a 242+996-tone RU, a 484+996-tone RU, a 484+996×2-tone RU, a 484+996×3-tone RU, and a 996×4-tone size RU, which may be configured using a combination of basic large RUs, may be defined as a large RU.

In an embodiment for allocating a large RU of 20 MHz or higher, after an RU of 20 MHz (242-tone size) is signaled in the RU allocation field, one or more user specific fields corresponding to the RU allocation field may be signaled, thereby allocating an RU of 20 MHz to one or more reception devices. Alternatively, 40 MHz, 80 MHz, 160 MHz, 240 MHz, or 320 MHz (484, 996 (or 484+484), 996×2, 996×3, or 996×4-tone respectively) RU allocation may be performed in the same manner as 20 MHz RU allocation. In order to signal the large RU except for the basic Large RU, the RU allocation field may include a bit combination indicating a 242+484-tone RU, a 242+996-tone RU, a 484+996-tone RU, a 484+996×2-tone RU, and a 484+996×3-tone RU.

FIG. 23(c) illustrates an example of a 60 MHz RU configuration. In an embodiment of 60 MHz RU allocation, in order to signal a 242+484-tone RU (60 MHz size) located over an 80 MHz band, the RU allocation field classifies RUs into 4 types of 242+484-tone RUs depending on a location of an excluded 20 MHz band among four 20 MHz bands (when the 80 MHz band is divided into four 20 MHz bands). The excluded 20 MHz may correspond to a band allocated to another device.

For example, a 484+242-tone RU may be allocated for transmission of an EHT PPDU of 80 MHz, to which OFDMA is not applied. The 484+242-tone RU may be obtained by puncturing one of four 242-tone RUs in the EHT PPDU of 80 MHz. A data subcarrier of the 484+242-tone RU includes data subcarriers of a 484-tone RU and a 242-tone RU constituting the 484+242-tone RU.

That is, the 484+242-tone RU may be configured by puncturing one of four 242-tone RUs for the EHT PPDU of 80 MHz. In this case, a 484-tone RU may include two 242-tone RUs, and the punctured 242-tone RU may be located in the middle.

Alternatively, if some RUs among the four 242-tone RUs are allocated to other terminals in the EHT PPDU, the 484+242-tone RU may be allocated to the terminal. That is, for the 484+242-tone RU, when two terminals receive the EHT PPDU of 80 MHz, if one of 242-tone RUs is allocated to one of the two terminals, 484+242-tone discontinuous multiple RUs may be allocated to the remaining terminal.

FIG. 23(d) illustrates an embodiment of a 120 MHz RU configuration. In an embodiment of 120 MHz RU allocation, in order to signal a 484+996-tone RU (120 MHz size) located throughout a 160(80+80) MHz band, the RU allocation field may classify RUs into 4 types of 484+996-tone RUs depending on a location of an excluded 40 MHz band among four 40 MHz bands (when the 160 MHz band is divided into four 40 MHz bands). In the same manner as the embodiment of the 60 MHz and 120 MHz RUs described above, a 140 MHz RU configuration within a 160 MHz bandwidth, 220 MHz and 200 MHz RU configurations within a 240 MHz bandwidth, and 280 MHz and 240 MHz RU configurations within a 320 MHz bandwidth may be classified and indicated according to the size and location of excluded bands.

When the RU allocation field described via the embodiment of FIG. 23 is used, even if two continuous basic small RUs are allocated or a large RU including two or more basic large RUs is allocated, a user specific field of a single reception device may be included only once in one content channel among all content channels.

For example, a 996+484-tone RU may be allowed in a 160/80+80 (TBD) MHz EHT PPDU to which OFDMA is not applied. The 996+484-tone RU may be obtained by puncturing one of four 484-tone RUs in the 160/80+80 (TBD) MHz EHT PPDU. That is, similar to the 484+242-tone RU, the 996+484-tone RU may be configured by puncturing one of four 484-tone RUs for the EHT PPDU of 80 MHz. In this case, a 996-tone RU may include two 484-tone RUs, and the punctured 484-tone RU may be located in the middle.

A data subcarrier of the 996+484-tone RU may include data subcarriers of a 996-tone RU and a 484-tone RU constituting the 996+484-tone RU.

That is, not only may a single RU be allocated to an STA, but a plurality of RUs may be allocated to the STA. In this case, the number of tones (or frequency bands) of allocated RUs may be different from each other. In this case, the RUs of different tones may be obtained by puncturing a specific RU between continuous RUs.

Figure 24:
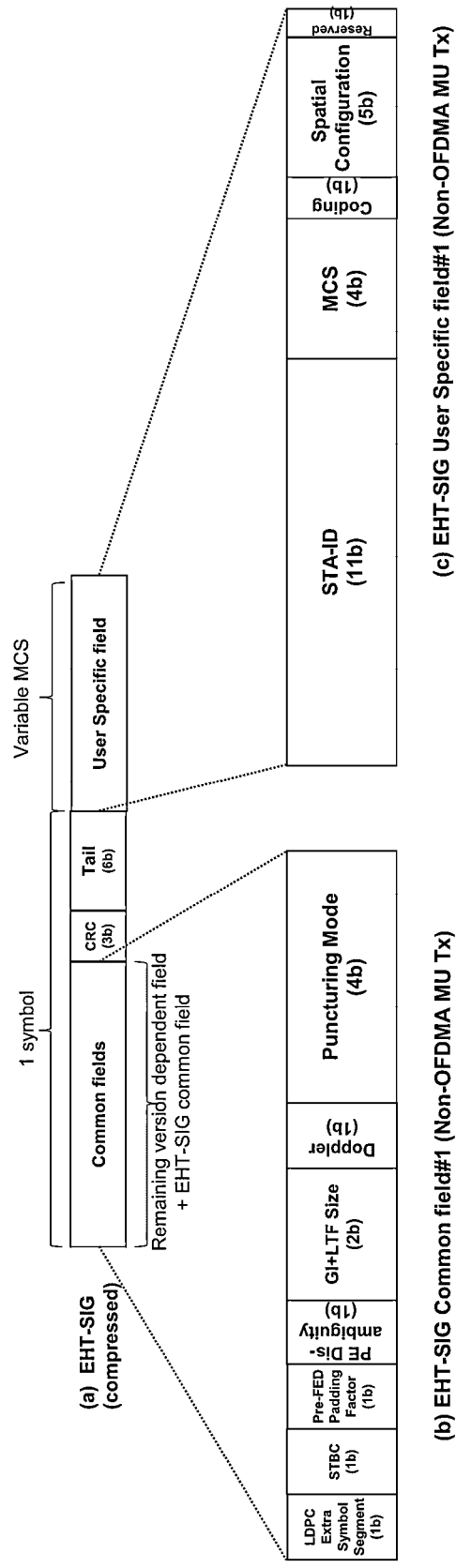
FIG. 24 illustrates an example of an EHG-SIG field when a non-OFDMA PPDU is applied according to an embodiment of the present invention.

FIG. 24 illustrates an example of an EHG-SIG field when a non-OFDMA PPDU is applied according to an embodiment of the present invention.

FIG. 24(a) illustrates an example of a format of an EHT-SIG field included in a non-OFDMA MU PPDU to which OFDMA is not applied. As illustrated in FIG. 24(a), unlike an EHT-SIG field of an FDMA MU PPDU, to which OFDMA is applied, for an EHT-SIG field of a non-OFDMA MU PPDU, an EHT-SIG RU allocation field is compressed so as not to be included in the EHT-SIG field.

That is, the EHT-SIG RU allocation field may be included in the EHT-SIG field when it is indicated that a compression mode is not applied, by a compression field included in U-SIG (non-compressed mode). In this case, the EHT-SIG RU allocation field may all be included in at least one content channel included in the EHT-SIG field.

Specifically, whether the RU allocation field is included in the EHT-SIG field is signaled using an EHT-SIG compression field of a U-SIG field. For the non-OFDMA MU PPDU, OFDMA is not applied, and an MU PPDU is transmitted to all reception devices by using the same RU, so that individual RU allocation is not performed for each reception device.

However, within a PPDU bandwidth signaled in the U-SIG field, only a puncturing (preamble puncturing)-applied type is signaled, and the reception device may thus recognize a MU-PPDU type (RU configuration). That is, if the non-OFDMA PPDU to which OFDMA is not applied is transmitted, the U-SIG field may include a puncturing channel information field indicating a pattern of RUs punctured in the total bandwidth in which the PPDU is transmitted. If an STA receives the non-OFDMA PPDU from an AP, RUs punctured in the total bandwidth in which the PPDU is transmitted may be recognized via a specific field (puncturing channel information field) included in the U-SIG field of the non-OFDMA PPDU, and the non-OFDMA PPDU may be received in an RU other than the punctured RUs. In this case, the puncturing channel information field may indicate a pattern of punctured RUs to the STA via a bit map format.

The EHT-SIG field of the non-OFDMA PPDU includes 2 to 16 user specific fields, and each user specific field includes STA-IDs of different reception devices. The user-specific field may include, in units of two, a user block field including CRC and tail, and a last user block field may include one user-specific field, CTC, and tail.

FIG. 24(b) illustrates an example of EHT-SIG common field #1 of the non-OFDMA MU PPDU. EHT-SIG common #1 field included in the non-OFDMA MU PPDU may have a puncturing mode field, and the puncturing mode field may be shown in all or some bits to which the Number of RU Allocation field(s) of the EHT-SIG common field included in the OFDMA PPDU have been allocated. In an embodiment, the puncturing mode field may be signaled by allocating 3 bits out of 4 bits of a Number of RU Allocation subfield of an OFDMA PPDU EHT-SIG common field. The remaining 1 bit may be shown as a reserved field, or may be compressed so as not to be shown.

The puncturing mode field signals a discontinuous type (puncture mode) of RUs of a channel via which the non-OFDMA PPDU is transmitted, in the total bandwidth indicated via a bandwidth field of the U-SIG field. The signaling may be performed using a defined puncturing mode, or may be performed using a bitmap by dividing the total bandwidth or a bandwidth excluding primary 20 MHz into specific frequency domain units (20 MHz, 40 MHz, and 80 MHz).

Via the bandwidth field of the U-SIG field, the RU allocation field of the EHT-SIG field, and the puncturing mode field, the reception devices may recognize an RU combination via which the reception devices themselves need to receive the PPDU within the bandwidth. That is, STAs may recognize the total bandwidth in which the PPDU is transmitted via the bandwidth field included in the U-SIG, and may recognize punctured RUs in the total bandwidth via the puncturing mode field. If OFDMA is not applied, RUs for STAs of MU-MIMO are equally segmented, and therefore the RU allocation field may be omitted. However, if OFDMA is applied, the RU allocation field may be included in the common field of the EHT-SIG field in order to indicate, to terminals, RU configurations for allocation of RUs to the respective terminals, and the STA may recognize the configurations of the RUs via the RU allocation field.

The STA may recognize RUs via which the PPDU is actually transmitted, based on the bandwidth field and the puncturing mode field, as described above. The fields remaining after excluding the puncturing mode field have the same configuration and function as those of fields constituting an OFDMA MU PPDU EHT-SIG common field.

FIG. 24(c) illustrates an example of EHT-SIG user specific field #1 of the non-OFDMA MU PPDU. In EHT-SIG user specific field #1 of the non-OFDMA MU PPDU, user specific fields of devices may appear as many as the maximum number of service-available MU-MIMO users, wherein the devices are to receive the PPDU by using a discontinuous channel signaled via the puncturing mode field of the EHT-SIG common field and the bandwidth field of the U-SIG field.

Accordingly, 16 antennas are to be used for 11be, and therefore in an EHT-SIG user specific #1 field of the non-OFDMA MU PPDU, 2 to 16 user specific fields including STA-IDs of different reception devices may be shown.

An STA-ID field may include an STA-ID for identification of a reception device that needs to receive a corresponding non-OFDMA MU PPDU, and 11 bits may be allocated. An MCS field indicates the modulation and coding scheme applied to a data field of the reception device corresponding to the STA-ID, and 4 bits may be allocated. 1 bit is allocated to a coding field, and 0 or 1 may appear to indicate a used coding technique among BCC and LDPC. A spatial configuration field indicates the number of MU-MIMO spatial streams allocated to the reception device corresponding to the STA-ID, and 4 bits may be allocated.

Figure 25:
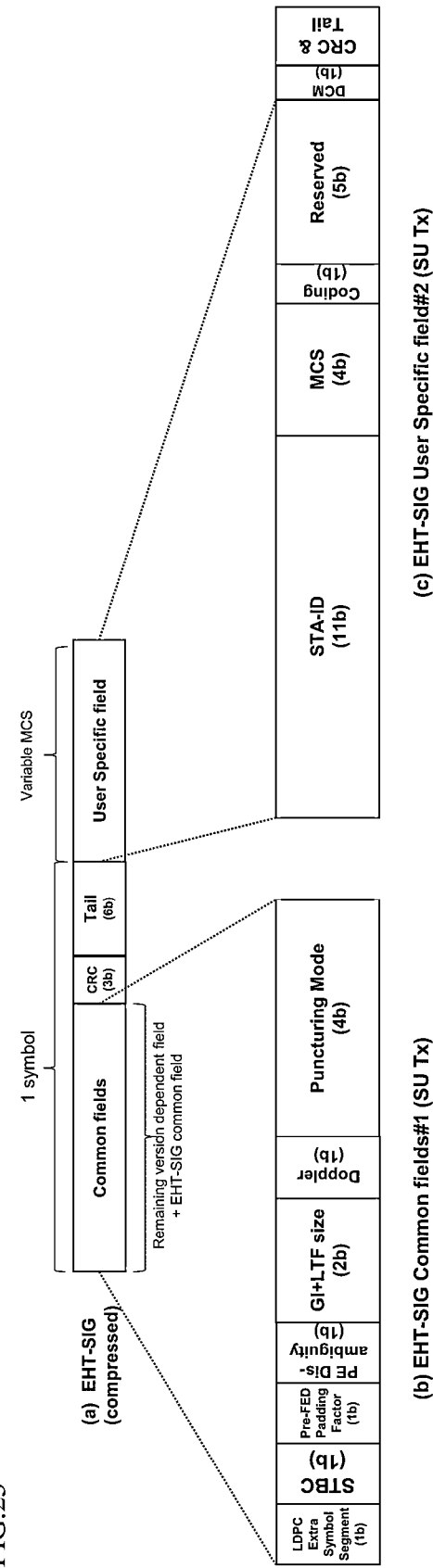
FIG. 25 illustrates an example of an EHT-SIG field when a single user (SU) PPDU is applied according to an embodiment of the present invention.

FIG. 25 illustrates an example of an EHT-SIG field when a single user (SU) PPDU is applied according to an embodiment of the present invention.

Referring to FIG. 25, if a PPDU type is an SU PPDU, some of fields of an MU PPDU may be omitted.

Specifically, FIG. 25(a) illustrates an example of an EHT-SIG field of an SU PPDU, and in the EHT-SIG field of the SU PPDU, an RU allocation field may be compressed so as not to be included, as in a non-OFDMA MU EHT-SIG. One EHT-SIG user specific field #2 may be included in a user specific field of the SU PPDU. Specifically, the SU PPDU may include fields that have failed to be included in the EHT-SIG field due to the size restriction of a U-SIG field and a specific field (e.g., a Number Of EHT-SIG Symbols Or MU-MIMO Users field, etc.) indicating the number of users of MU-MIMO. If a value of the specific field indicates that the number of STAs (or the number of users) is 1, a PPDU type is an SU PPDU, and if the value of the specific field indicates that the number of STAs is 2 or more, the PPDU type may be an MU PPDU, and the number of user fields included in the user specific field may be determined according to the number of STAs.

In the case of the SU PPDU, the number of STAs participating in MU-MIMO is 1, and the user specific field may thus include one user field.

FIG. 25(b) illustrates an example of EHT-SIG common field #1 of the SU PPDU. SU PPDU EHT-SIG common field #1 may have the same field configuration and function as those of non-OFDMA EHT-SIG common field #1. A puncturing mode field of SU PPDU EHT-SIG common field #1 may indicate the same mode as that of the puncturing mode field of non-OFDMA EHT-SIG common field #1, or may indicate a type in which some modes have been removed/added/changed.

FIG. 25(c) illustrates an example of EHT-SIG user specific field #2 of the SU PPDU. In the case of the SU PPDU, one EHT-SIG user specific field may be included. An STA-ID field may include an STA-ID for identification of a reception device that needs to receive a corresponding SU PPDU, and 11 bits may be allocated. An MCS field may include a coding MCS of the SU PPDU, and 4 bits may be allocated. 1 bit is allocated to a coding field, and 0 or 1 may appear to indicate a used coding technique among BCC and LDPC. A reserved field may be added to have the same size and structure as those of EHT-SIG user specific fields of the non-OFDMA MU PPDU and the OFDMA MU PPDU that are other PPDUs, or may be compressed and so as not to be included.

If the reserved field is included, bits allocated to the reserved field may be used to improve a puncturing resolution of the SU PPDU. For example, the puncturing mode field of the EHT-SIG common field may appear once more in the reserved field, and the puncturing mode field of the common field and the puncturing mode of the user specific field may indicate discontinuous channel types of primary 160 MHz and secondary 160 MHz, respectively.

As another example, the puncturing mode of the common field and the puncturing mode of the user specific field may be combined to indicate, using an 8-bit bitmap, a discontinuous type of RUs in a bandwidth. In this case, each of bandwidths corresponding to ⅛ of the total bandwidth may correspond to 1 bit, and a bit (first bit) corresponding to a region including primary 20 MHz may correspond to a bandwidth excluding primary 20 MHz. In an example of the 8-bit bitmap indicating a discontinuous type of a 160 MHz bandwidth, each 20 MHz of 160 MHz corresponds to 1 bit, and the 8-bit bitmap may be expressed as 0011 0000 or 1100 1111, thereby indicating that secondary 40 MHz has been punctured. In an embodiment of the 8-bit bitmap, 1000 0000 or 0111 1111 may be signaled in the 8-bit bitmap in order to signal that only a secondary 20 MHz channel of a 320 MHz BW has been punctured.

In this case, in the 8-bit bitmap expressing 320 MHz, a first bit corresponds to secondary 20 MHz, a second bit corresponds to secondary 40 MHz, and a third bit corresponds to 40 MHz, which corresponds to a lower frequency in secondary 80 MHz. In another embodiment of the 8-bit bitmap, 0100 0000 or 1011 1111 may be signaled in the 8-bit bitmap in order to signal that the secondary 40 MHz channel of the 320 MHz BW has been punctured. In the embodiment of the 8-bit bitmap, a BW region corresponding to each bit may be determined according to a positional relationship with primary 20 MHz or in ascending order of frequency.

Figure 26:
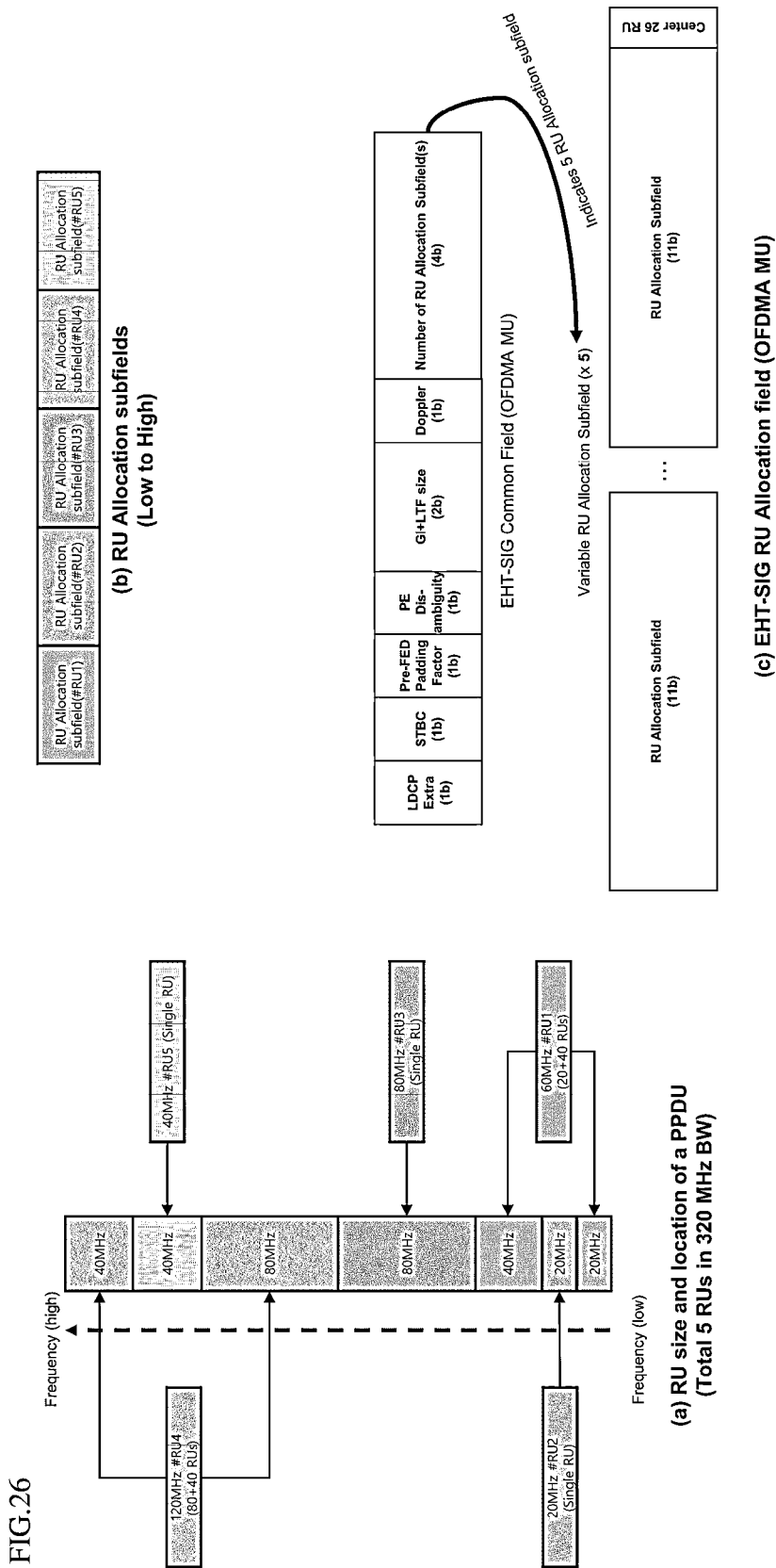
FIG. 26 illustrates an embodiment of large resource unit (RU) allocation according to an embodiment of the present invention.

FIG. 26 illustrates an embodiment of large resource unit (RU) allocation according to an embodiment of the present invention.

FIG. 26(a) illustrates an example of the size and configuration (combination) of a discontinuous large RU for transmission of an MU PPDU to which OFDMA has been applied, if the total bandwidth for PPDU transmission is 320 MHz. For the OFDMA MU PPDU in FIG. 26(a), a single RU or a combination of two discontinuous RUs may be allocated to a reception device within a 320 MHz bandwidth. RU #1 including a lowest frequency is signaled in a 20+40 MHz RU type in which a second 20 MHz RU has been excluded in 80 MHz, and RU #1 may be located in a first RU allocation field of RU allocation fields, as illustrated in FIG. 26(b). RU #2 including a second lowest frequency is signaled as a 20 MHz (242-tone size) RU and may be located in a second RU allocation field. RU #3 including a third lowest frequency is signaled as an 80 MHz (996-tone size) RU and may be located in a third RU allocation field. RU #4 including a fourth lowest frequency is signaled in an 80+40 MHz RU type in which third 40 MHz has been excluded in 160 MHz, and may be located in a fourth RU allocation field. RU #5 located at a highest frequency is signaled as a 40 MHz (484-tone size) RU and may be located in a last field. The embodiment includes five RU allocation fields, and therefore a Number of RU Allocation subfield of an EHT-SIG common field may be configured to a value indicating 5, as in FIG. 26(c).

Figure 27:
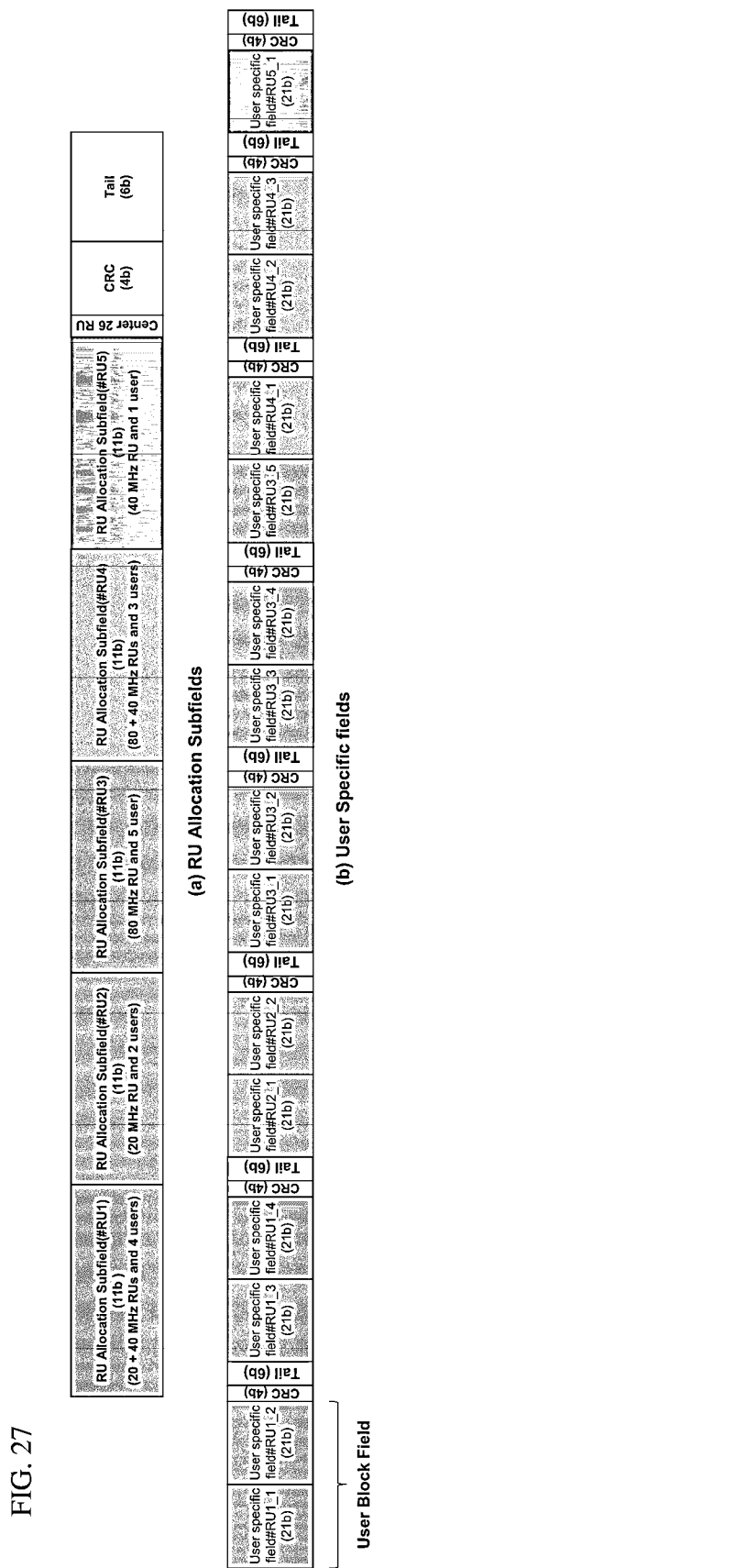
FIG. 27 illustrates an embodiment of single content channel signaling for an OFDMA MU PPDU according to an embodiment of the present invention.

FIG. 27 illustrates an embodiment of single content channel signaling for an OFDMA MU PPDU according to an embodiment of the present invention.

FIG. 27 illustrates a signaling embodiment of a single content channel for the 320 MHz OFDMA MU PPDU of FIG. 26. In FIG. 27, it is assumed that #RU1 performs MU-MIMO transmission allocated to 4 reception devices, and #RU2, #RU3, #RU4, and #RU5 perform MU-MIMO transmission allocated respectively to 2 reception devices, 5 reception devices, 3 reception devices, and 1 reception device, simultaneously.

FIG. 27(a) illustrates an example of an RU allocation field of a single content channel. In order to signal that there are four reception devices to which #RU1 is to be allocated, a first RU allocation field may signal, using some bits allocated to the RU allocation field (#RU1), a value obtained by subtracting 1 from the number of user specific fields corresponding to the RU allocation field. In an example of the RU allocation field (#RU1), the RU allocation field (#RU1) may have a value of xxx xxxx 0011 (=4-1), wherein the reception device may find out, based on xxx xxxx, that an RU configuration corresponds to a (20+40) MHz RU configuration in which second 20 MHz in 80 MHz has been excluded, and the reception device may find out, based on last 4 bits, that four user specific fields corresponding to the RU will be included. In the same manner as that of the RU allocation field (#RU1), RU allocation fields (#RU2, #RU3, #RU4, and #RU5) indicate yyy yyyy 0001 (=2-1), zzz zzzz 0100 (=5-1), qqq qqqq 0010 (=3-1), and ttt tttt 0000 (=1-1) respectively, wherein each RU allocation field may signal an RU configuration and the number of corresponding user specific fields. In the embodiment, 7 bits excluding the last 4 bits of each RU allocation field indicate the configuration and location of the RU, which are indicated by each RU allocation field.

FIG. 27(b) illustrates an example of a user specific field of a single content channel. The number of user specific fields, which corresponds to the number based on a total number of reception devices, signaled by each RU allocation field, are shown. Therefore, the reception device may recognize that STA-IDs indicated in user specific field #RU1_1, user specific field #RU1_2, user specific field #RU1_3, and user specific field #RU1_4 are IDs of STAs to use an RU (20+40 MHz) indicated by the RU allocation field (#RU1). After receiving all the RU allocation fields, each reception device may identify the configuration and location of each RU in the total BW by filling in RU configurations signaled by the RU allocation fields starting from a low frequency, and may check STA-ID of a user specific field that is shown subsequently, so as to identify an RU allocated to the reception device itself.

Figure 28:
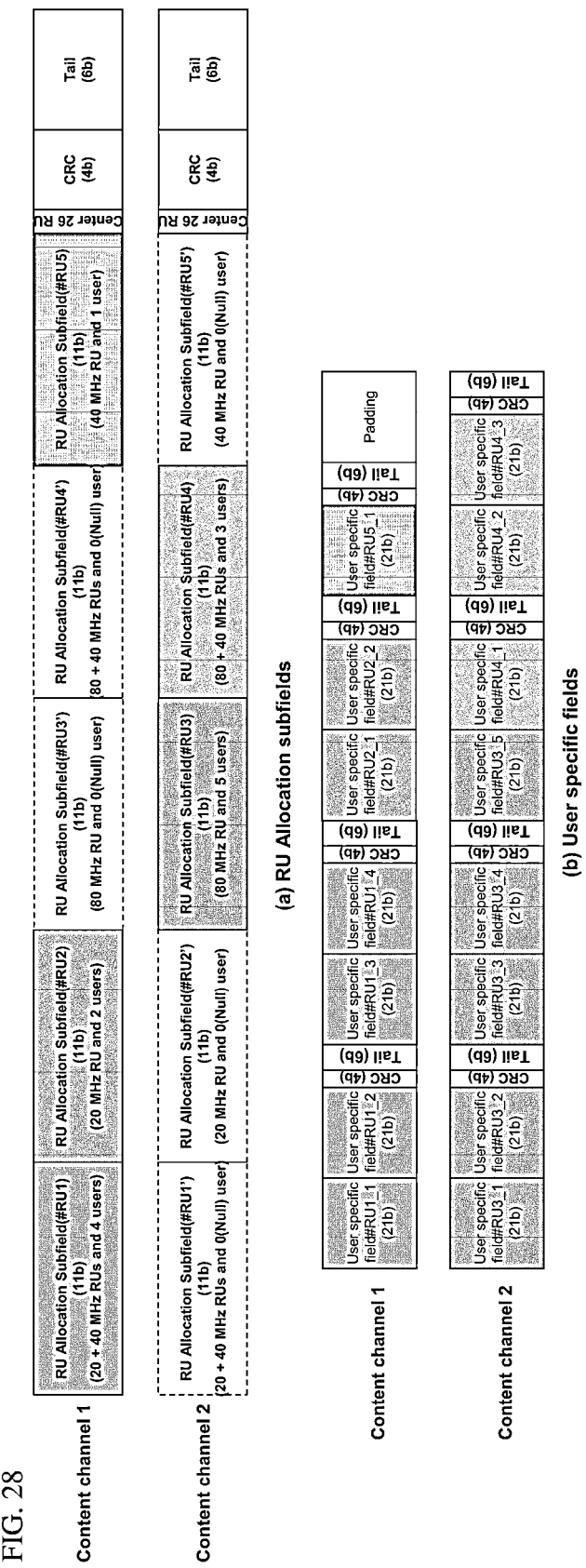
FIG. 28 illustrates an embodiment of signaling two content channels for a specific frequency band according to an embodiment of the present invention.

FIG. 28 illustrates an embodiment of signaling two content channels for a specific frequency band according to an embodiment of the present invention.

FIG. 28(a) illustrates an example of RU allocation fields included in two content channels. In FIG. 28(a), two content channels 1 and 2 may include RU allocation fields of the same RU configuration for signaling of 0 reception device or 1 or more reception devices. A transmission device determines which content channel signals a reception device instead of 0 for a single RU, when an EHT-SIG field is configured so that lengths of two content channels are similar. For example, an RU allocation field (#RU1) shown in content channel 1 is signaled as xxx xxxx 0011 (=4-1), and an RU allocation subfield (#RU1') shown in content channel 2 may show a bit combination indicating the same RU configuration+null user as those of #RU1.

In FIG. 28(b), the number of user specific fields shown in two content channels corresponds to a total number of reception devices signaled in the RU allocation field of each content channel. Accordingly, in the embodiment, four user specific fields for the RU allocation field (#RU1) of content channel 1 are shown in content channel 1, and the user specific field for the RU allocation field (#RU1') of common channel 2 is not shown in common channel 2. A reason that both RU allocation fields (#RU1 and #RU1') for the same RU configuration are shown in each content channel even though there is no user corresponding to the RU allocation field is to enable the reception device to identify the RU configuration and location of the total BW even if the RU allocation field shown in one content channel is decoded.

Figure 29:
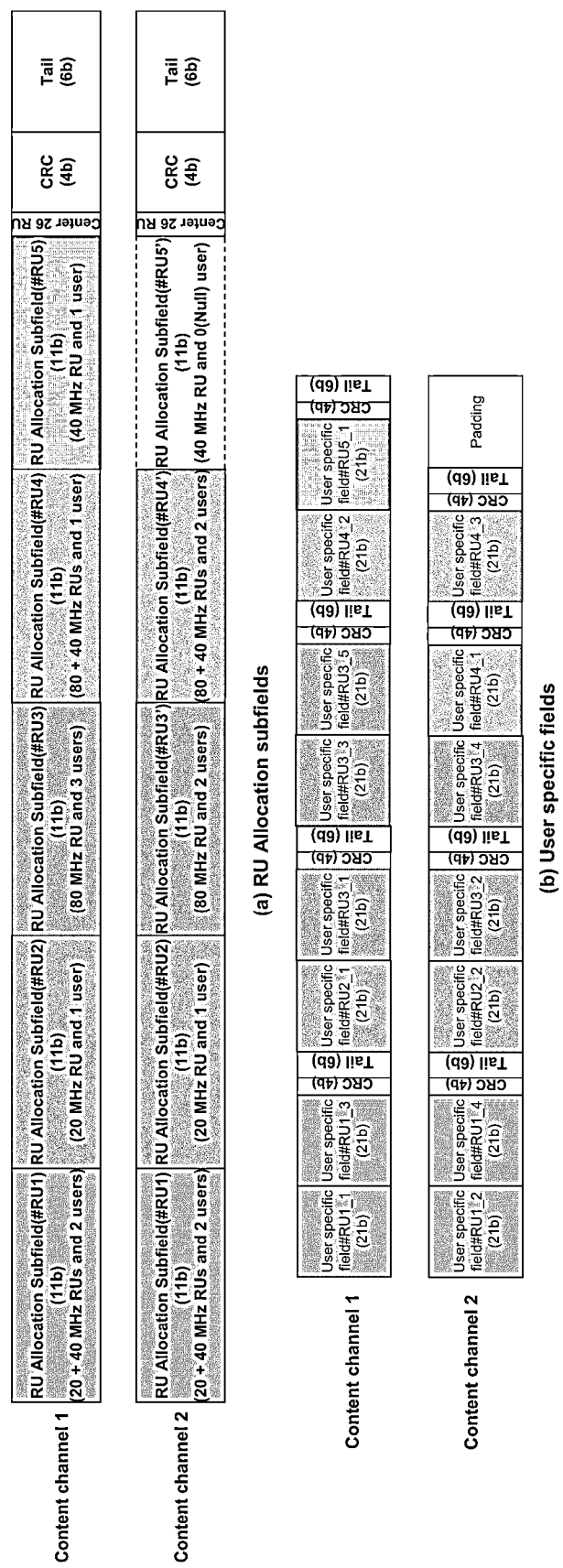
FIG. 29 illustrates another embodiment of signaling two content channels for a specific frequency band according to an embodiment of the present invention.

FIG. 29 illustrates another embodiment of signaling two content channels for a specific frequency band according to an embodiment of the present invention.

FIG. 29(a) illustrates another embodiment of an RU allocation field for two content channels.

As illustrated in FIG. 29(a), content channel 2 shows an RU allocation field of the same RU configuration in which the number of reception devices is the same or the number of reception devices is different by one. In an embodiment, an RU allocation field (#RU1) shown in content channel 1 is signaled as xxx xxxx 0001 (=2-1), and an RU allocation field (RU1) shown in content channel 2 is also signaled as xxx xxxx 0001 (=2-1). In an embodiment, an RU allocation field (#RU3) shown in content channel 1 may be signaled as zzz zzzz 0010(=3-1), and an RU allocation field (#RU3') may be signaled as zzz zzzz 0001(=2-1).

FIG. 29(b) illustrates another example of a user specific field included in two content channels. The number of user specific fields shown in each content channel corresponds to a total number of reception devices signaled in the RU allocation field of each content channel 1. Therefore, in the embodiment, two user specific fields for the RU allocation field (#RU1) are shown in each of content channel 1 and content channel 2. In the embodiment, the user specific fields for the respective RU allocation fields are included in content channels 1 and 2 and shown alternately, so that EHT-SIG lengths of the two content channels may be determined to be similar, and as a result, padding for matching the lengths of the two content channels may be reduced. The RU allocation fields indicating the same RU configuration are shown in both content channels 1 and 2, so that the reception device may identify the RU configuration and location of the total BW even if only the RU allocation field shown in one content channel is decoded.

Figure 30:
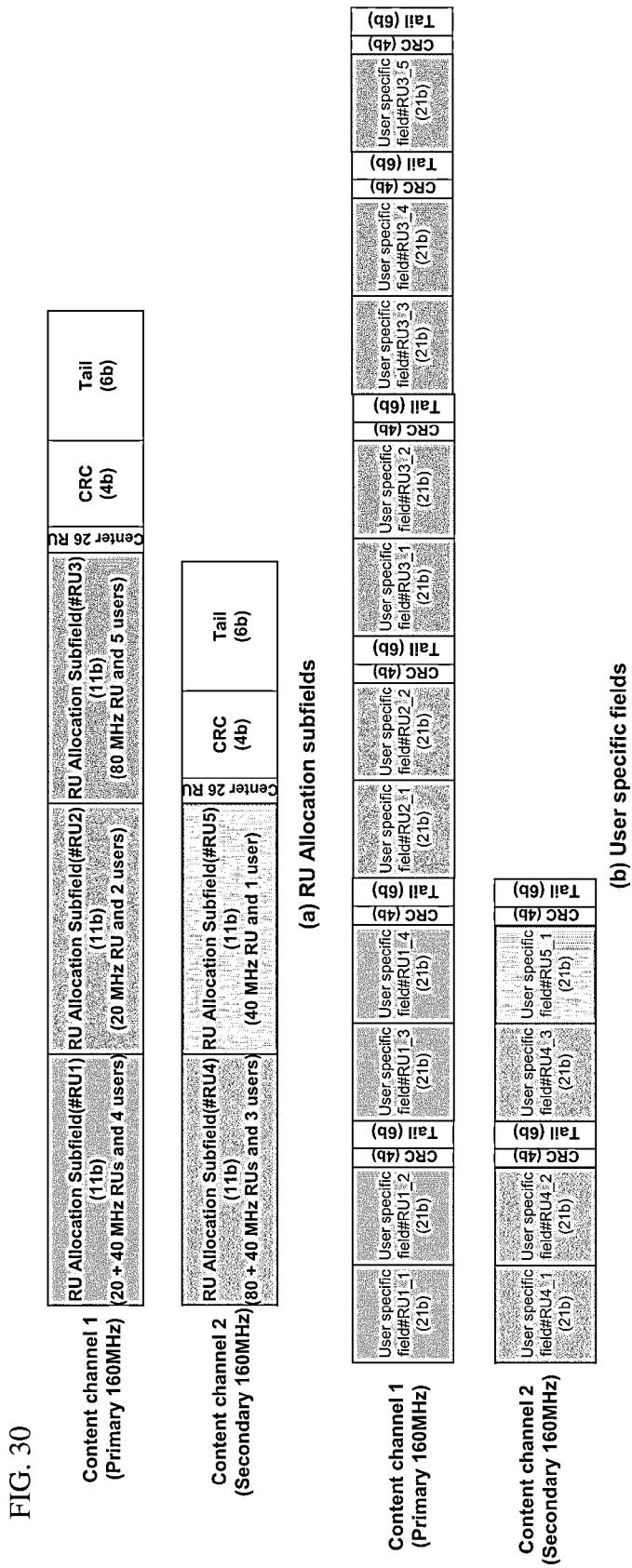
FIG. 30 illustrates another embodiment of signaling two content channels for a specific frequency band according to an embodiment of the present invention.

FIG. 30 illustrates another embodiment of signaling two content channels for a specific frequency band according to an embodiment of the present invention.

FIG. 30 illustrates an embodiment of two content channels for the OFDMA MU PPDU transmitted at 320 MHz that is the total bandwidth for PPDU transmission, described in FIG. 26.

In the embodiment of FIG. 30, 320 MHz is divided into two 160 MHz and signaling of a single content channel for each 160 MHz is performed, and as a result, signaling of the OFDMA MU PPDU for 320 MHz may be performed via two content channels.

Therefore, for understanding of the embodiment, description of an omitted part may be provided by applying the single content field embodiment of FIGS. 27 to 160 MHz. The embodiment may be effective when a 320 MHz (or 160 MHz) operation of 11be is performed via two 160 MHz (or 80+80 MHz) operations that are physically substantially separated. The embodiment may also be effective when a 160+80 MHz operation is performed via a 160 MHz operation and an 80 MHz operation that are physically significantly separated.

FIG. 30(a) illustrates another example of an RU allocation field included in two content channels so as to be transmitted. In FIG. 30(a), two content channels 1 and 2 perform different signaling of 160 MHz. To this end, in the embodiment, an EHT-SIG common field may include a Number of RU Allocation subfield in each of primary 160 MHz and secondary 160 MHz, and transmit the same. That is, a structure in which signaling of primary 160 MHz and secondary 160 MHz is segmented from the EHT-SIG common field may be available. All RU allocation fields (#RU1, #RU2, and #RU3) shown in content channel 1 signal an RU including a combination of RUs included in primary 160 MHz, and in all RU allocation fields (#RU4 and #RU5) shown in content channel 2, an RU including a combination of RUs included in secondary 160 MHz may be allocated to an STA.

RU1, #RU2, and #RU3 may be disposed in order of RU configurations including lower frequencies within primary 160 MHz, and #RU4 and #RU5 may be disposed in order of RU configurations including lower frequencies within secondary 160 MHz. Accordingly, a reception device may identify only the RU configuration and location of a 160 MHz band in which a user specific field including STA-ID of the reception device itself is shown, and then the reception device may identify an RU allocated thereto.

FIG. 30(b) illustrates another embodiment of a user specific field included in each of two content channels. In the case of FIG. 30(b), due to the structure in which the content channels of primary 160 MHz and secondary 160 MHz are segmented, padding for matching lengths of the content channels 1 and 2 may be omitted.

Figure 31:
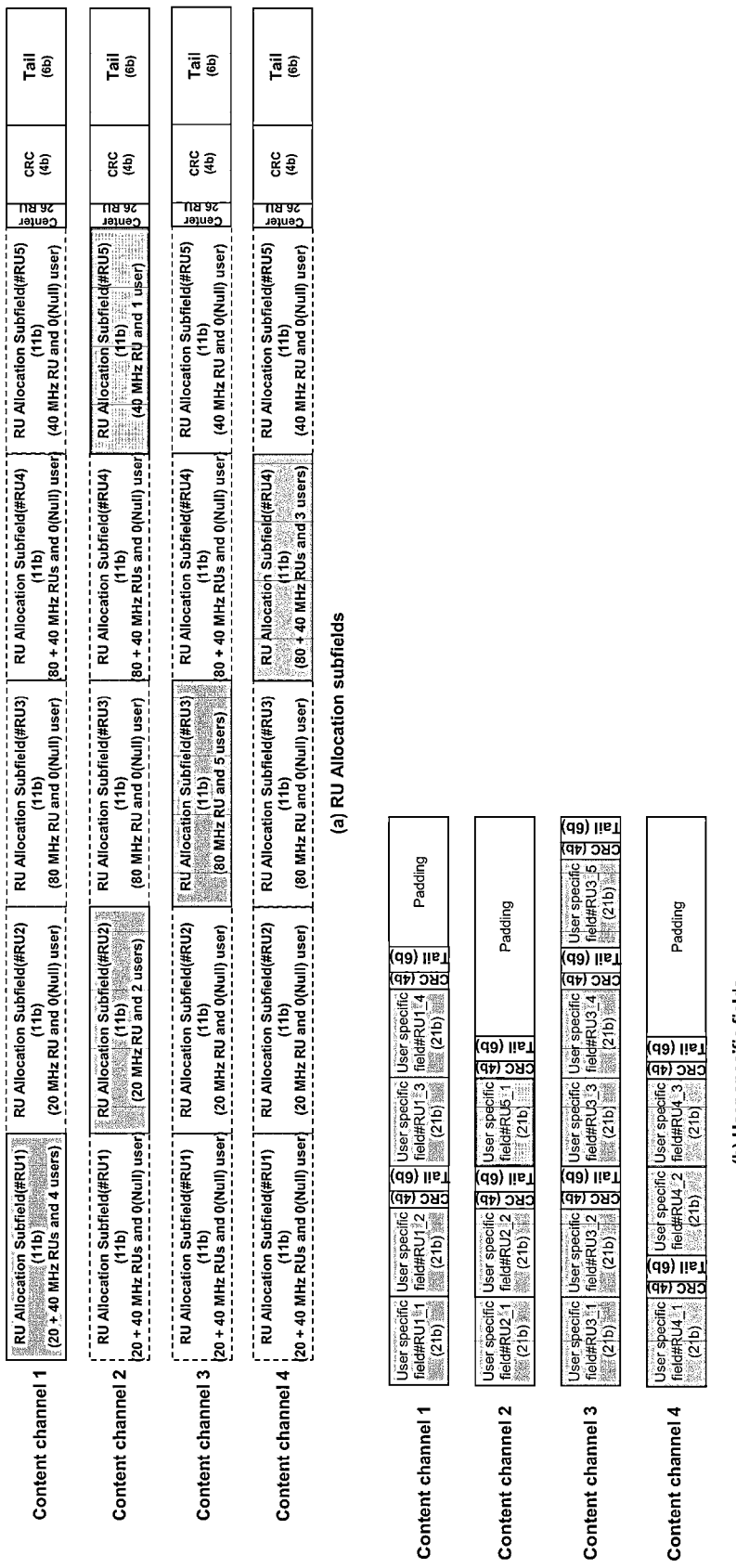

FIG. 31 and FIG. 32 illustrate an embodiment of four content channels for an OFDMA MU PPDU of a specific frequency band according to an embodiment of the present invention.

Referring to FIG. 31 and FIG. 32, if the total bandwidth for PPDU transmission described in FIG. 26 is 320 MHz, an OFMDA MU PPDU may include four content channels.

Specifically, FIG. 31 is a case in which the embodiment of two content channels described in FIG. 28 is expanded to four content channels, and FIG. 32 is a case in which two content channels described in FIG. 16 are expanded to four content channels.

Figure 33:
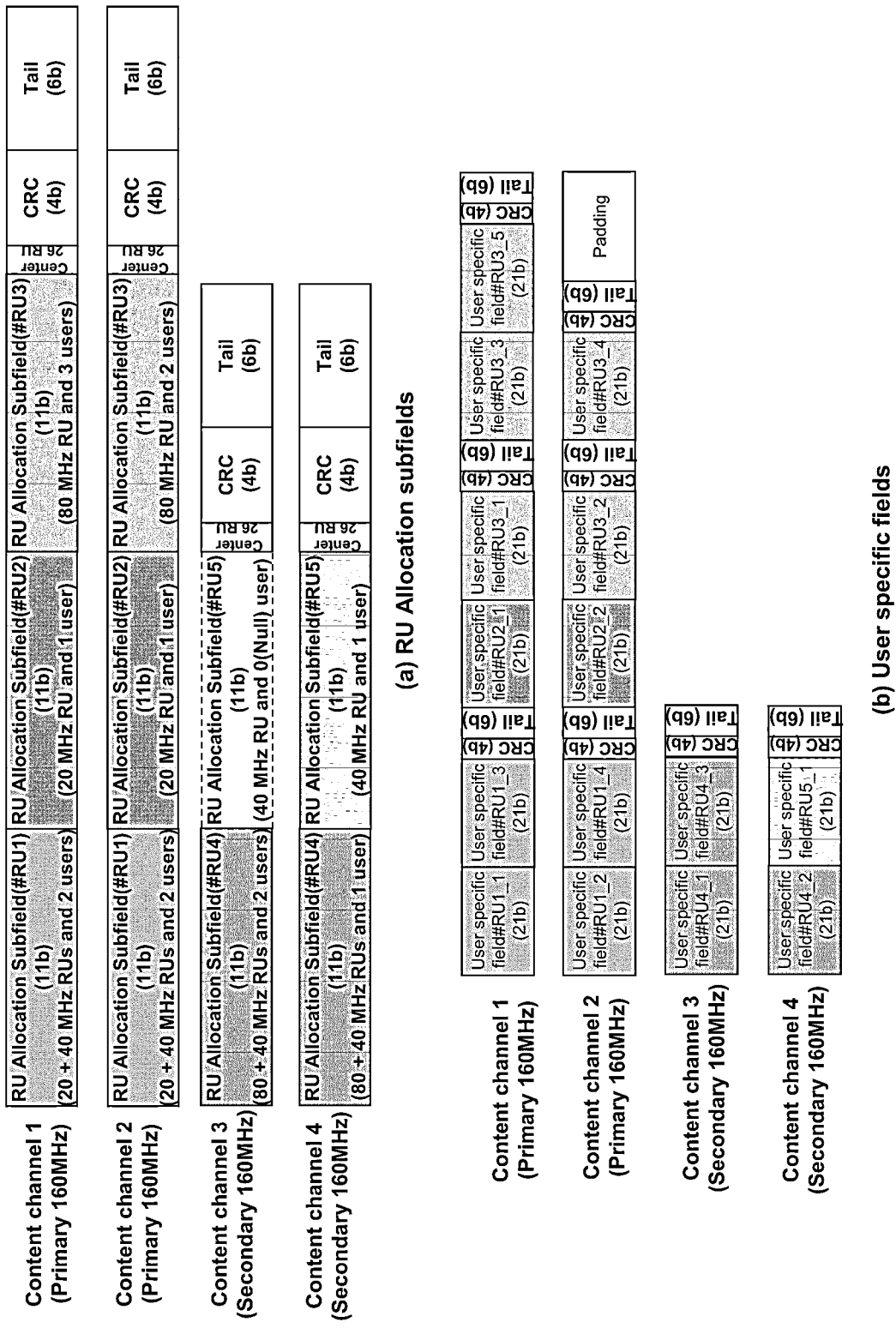
FIG. 33 illustrates another embodiment of signaling four content channels for a specific frequency band according to an embodiment of the present invention.

FIG. 33 illustrates another embodiment of signaling four content channels for a specific frequency band according to an embodiment of the present invention.

FIG. 33 is an embodiment combined to the embodiments of FIG. 29 and FIG. 30, wherein four content channels may be included in the MU PPDU. Specifically, if the total bandwidth for PPDU transmission is 320 MHz, 320 MHz may be divided into two segments (primary 160 MHz and secondary 160 MHz). Each segment may include two content channels, and the two content channels may alternately include a user specific field corresponding to an RU allocation subfield.

Figure 34:
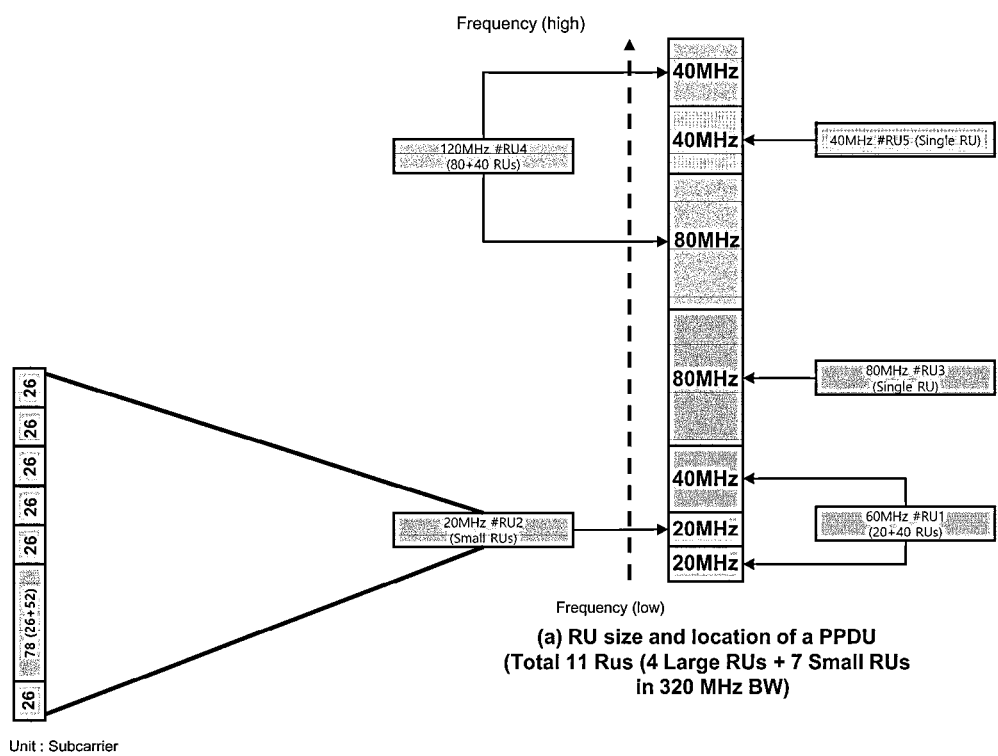
FIG. 34 illustrates an example of a method of configuring resource units of different sizes according to an embodiment of the present invention.

FIG. 34 illustrates an example of a method of configuring resource units of different sizes according to an embodiment of the present invention.

Referring to FIG. 34, if the total bandwidth for PPDU transmission is 320 MHz, and OFDMA is applied, an OFDMA MU PPDU may include discontinuous large RUs and small RUs.

Specifically, in FIG. 34(a), a large RU configuration and a single 20 MHz RU similar to those in FIG. 26(a) are segmented into 7 small RUs and may be used for PPDU transmission. In FIG. 34, a single RU includes a number of tones less than 78, and therefore #RU2 used as a small RU cannot be used for MU-MIMMO, and each of one 78-tone RU and six 26-tone RUs may be allocated to a single reception device.

Figure 35:
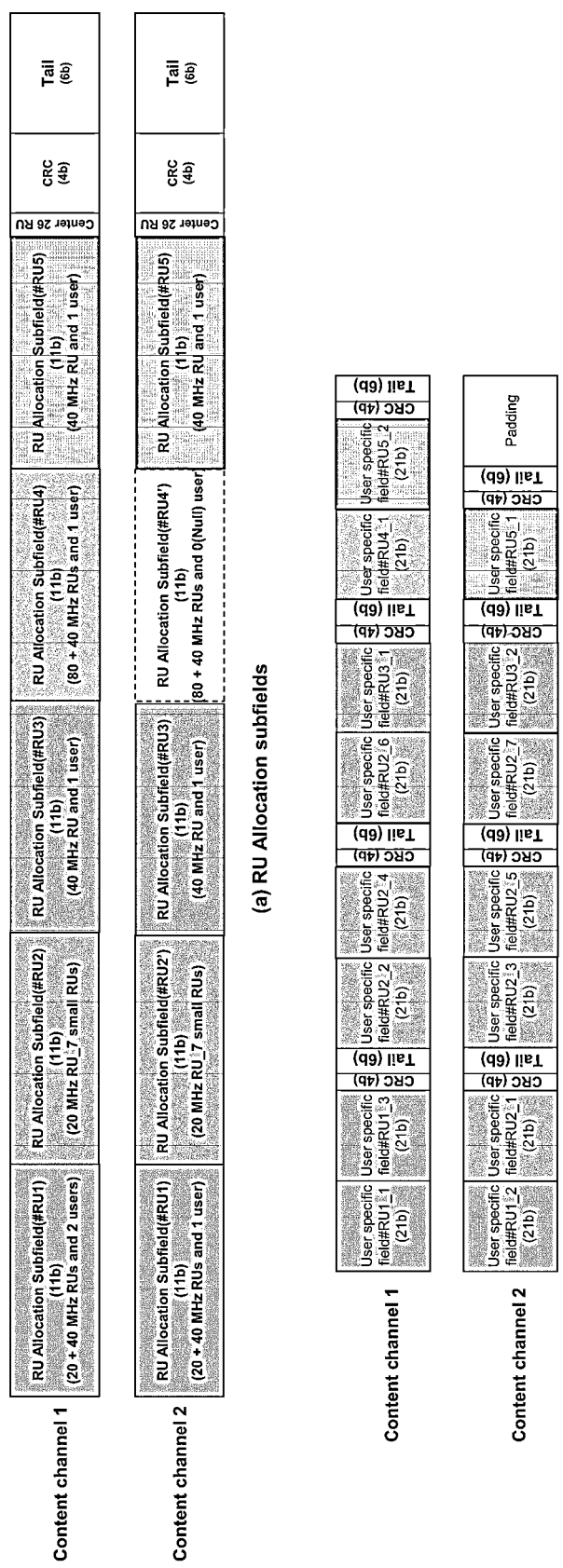
FIG. 35 illustrates another example of a method of configuring resource units of different sizes according to an embodiment of the present invention.

FIG. 35 illustrates another example of a method of configuring resource units of different sizes according to an embodiment of the present invention.

FIG. 35 illustrates an example of an RU allocation field when an RU is allocated via the method described in FIG. 34 and two content channels are included in a PPDU and transmitted.

As illustrated in FIG. 35, for each of content channels 1 and 2, the same larger RU configuration and/or small RU configuration, in which the number of reception devices receiving content channels 1 and 2 is the same or different by 1, may be used. User specific fields corresponding to the RU allocation field may be alternately included in two content channels and transmitted, wherein the user specific fields are included alternately in order starting from a content channel other than a content channel in which a last user specific field of a previous RU allocation field is shown. For example, the RU allocation field may be located in an odd-numbered field in the case of content channel 1, and the RU allocation field may be located in an even-numbered field in the case of content channel 2.

A user specific field for a first RU allocation field may be configured to be alternately located starting from content channel 1 or 2.

FIG. 35(b) illustrates another example of a format of a user specific field when two content channels are included and transmitted in FIG. 34. The number of user specific fields included in each content channel may be determined based on the sum of the number of small RUs having a size smaller than 106-tone and the number of reception devices, to which a small RU having a size larger than 106-tone is applied, and large URs configured via the RU allocation field of each content channel.

That is, the number of user specific fields may be equal to a total number of reception devices to which RUs are allocated.

Accordingly, in FIG. 35, content channel 1 and content channel 2 may include two user specific fields and one user specific field respectively, wherein the user specific field corresponds to an RU allocation field (#RU1) that signals a large RU. Further, content channel 1 and content channel 2 may include three user specific fields and four user specific fields respectively, wherein the user specific field corresponds to an RU allocation field (#RU2) that signals a small RU.

Figure 36:
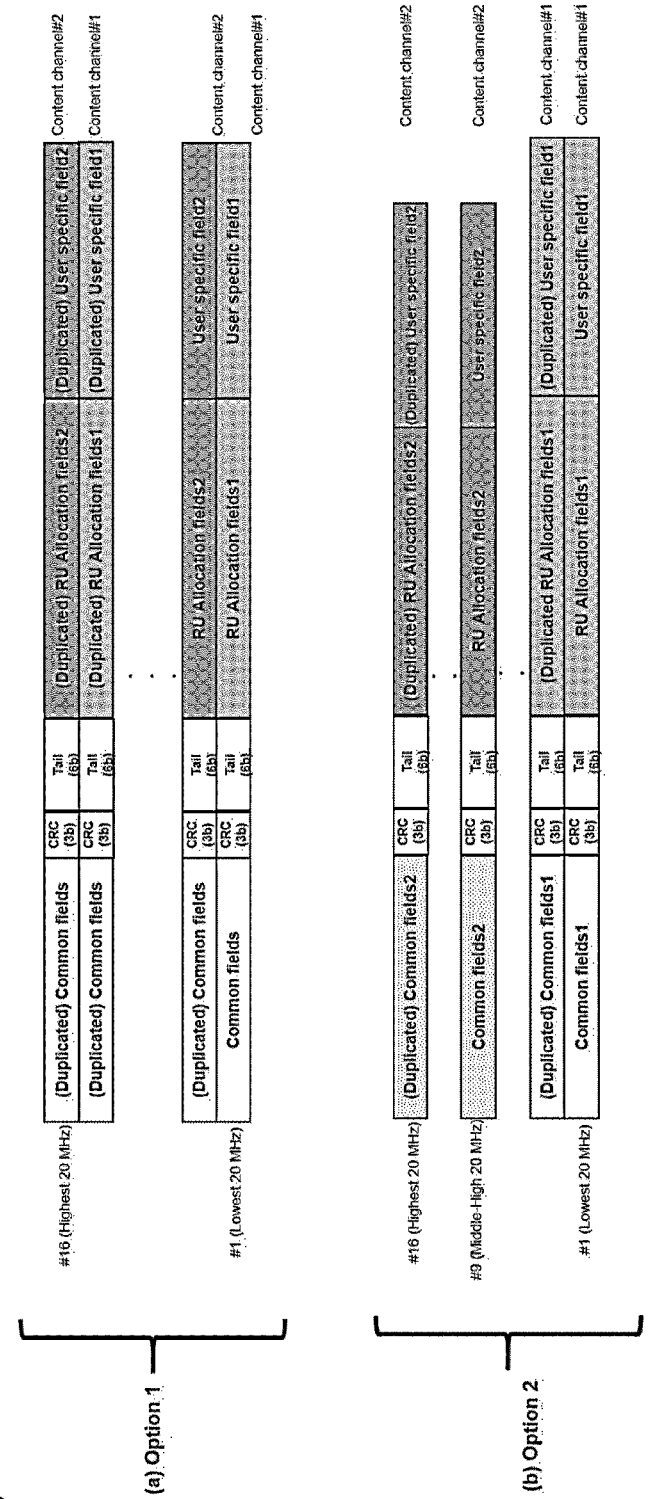
FIG. 36 illustrates an example of an EHT-SIG repeated within a bandwidth when a content channel is signaled according to an embodiment of the present invention.

FIG. 36 illustrates an example of an EHT-SIG repeated within a bandwidth when a content channel is signaled according to an embodiment of the present invention.

Referring to FIG. 36, at least one content channel included in an EHT-SIG field may be repeatedly transmitted for in predetermined frequency band.

Specifically, FIG. 36(a) shows a first method (option 1) for transmitting the EHT-SIG field including two content channels illustrated in FIG. 28 and FIG. 29. Specifically, in the first method according to FIG. 36(a), the same common field of the EHT-SIG field may be repeatedly transmitted every 20 MHz. That is, content channels 1 and 2 may be repeatedly transmitted alternately every 20 MHz, and content channels 1 and 2 may include the same common field. An RU allocation field located after the common field may be transmitted by crossing of different RU allocation fields 1 and 2 at adjacent 20 MHz. That is, content channels 1 and 2 may include different RU allocation fields.

User specific fields 1 and 2 corresponding to RU allocation fields 1 and 2 may be repeatedly included in content channels in which the corresponding RU allocation fields are located, respectively.

FIG. 23(*b*) illustrates a second method (option 2) for transmitting the EHT-SIG field including two content channels illustrated in FIG. 30.

Specifically, in the second method according to FIG. 36(*b*), content channels transmitted in respective segments for the total bandwidth, via which the PPDU is transmitted, may include a common field including different information, and within each segment, a common field including the same information may be repeatedly transmitted in each predetermined frequency band.

For example, if the total bandwidth for PPDU transmission is 320 MHz, 320 MHz may be divided into two segments in a 160 MHz unit. Each of the divided two segments may be referred to as primary 160 and secondary 160. Common fields included in content channels transmitted in primary 160 and secondary 160 include different information, wherein, in each 160 MHz segment, the same common field may be repeatedly included in the content channel and transmitted every 20 MHz.

That is, when the total bandwidth is 160 MHz, the total bandwidth may be divided into two segments of 80 MHz. Specific fields of the PPDU may include different contents in 80 MHz segments respectively, and each segment may include the same content every 20 MHz. For example, a U-SIG field of the PPDU or a common field of the EHT-SIG field may include different contents in 80 MHz segments, and each segment may include the same content every 20 MHz.

For example, in primary 160 and secondary 160, the common fields may indicate different numbers signaled in Number of RU Allocation subfields. In RU allocation fields appearing afterwards, different RU allocation fields 1 and 2 are shown in primary 160 and secondary 160 MHz respectively, wherein each RU allocation field is repeatedly shown every 20 MHz throughout 160 MHz. Respective user specific fields corresponding to RU allocation field 1 and RU allocation field 2 shown in primary 160 and secondary 160 repeatedly appear in each 160 MHz band in the same manner as the RU allocation fields.

In other words, in each content channel, one or more fields corresponding to each other in the same segment may be configured to have the same value, and one or more fields corresponding to each other between different segments may be configured to have different values.

For example, the same information may be included in at least one field among the same type (or kind) of fields excluding a resource unit allocation (RU allocation) field between the second content channel and first content channel within That is, resource unit allocation the same segment in at least one segment. information may be configured to a different value or different information when the content channel is different even in the same segment.

If the first content channel and the second content channel include a specific field, a value of the specific field may be configured identically in the same segment, but may be configured differently in different segments.

For example, if the first content channel and second content channel transmitted in the first segment include a first common field including at least one field including the same value, and the first content channel and second content channel transmitted in the second segment include a second common field including at least one field including the same value, the at least one field included in the first common field and the at least one field (same type) included in the second common field may include different values or different information.

Figure 37:
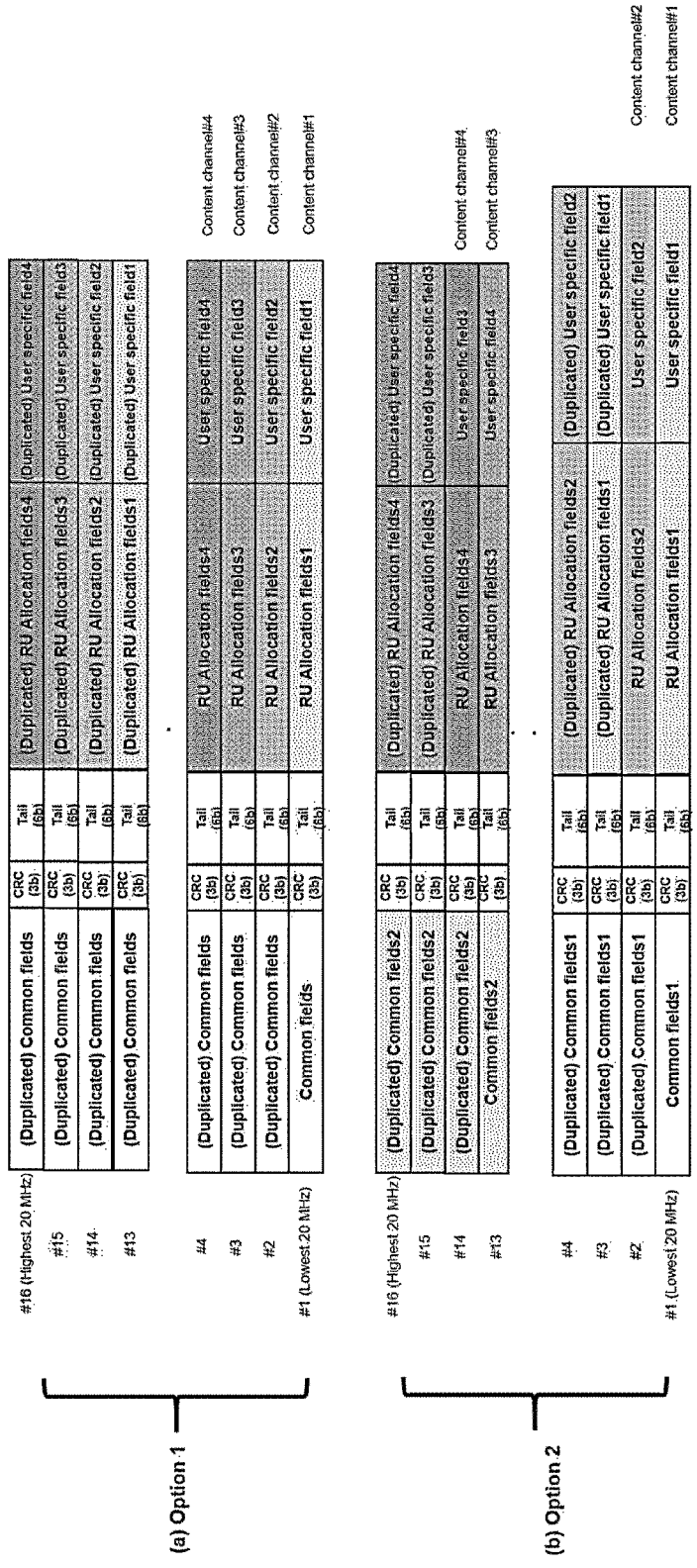
FIG. 37 illustrates another example of an EHT-SIG repeated within a bandwidth when a content channel is signaled according to an embodiment of the present invention.

FIG. 37 illustrates another example of an EHT-SIG repeated within a bandwidth when a content channel is signaled according to an embodiment of the present invention.

Referring to FIG. 37, the same field in each of segments obtained by segmentation of the total bandwidth may include different information, and the same information may be included in the segment and may be repeatedly transmitted in each predetermined frequency band.

Specifically, FIG. 37(*a*) shows a first transmission method (option 1) of an EHT-SIG field applicable when four content channels are transmitted, illustrated in FIG. 32. According to an embodiment of option 1, the same common field is shown repeatedly every 20 MHz. In RU allocation fields that appear afterwards, RU allocation fields 1, 2, 3, and 4 are repeatedly shown in an 80 MHz unit, wherein a channel including RU allocation field 1 may be referred to as content channel 1, a channel including RU allocation field 2 may be referred to as content channel 2, a channel including RU allocation field 3 may be referred to as content channel 3, and a channel including RU allocation field 4 may be referred to as content channel 4. User specific fields 1, 2, 3, and 4 corresponding to RU allocation fields included in the RU allocation fields may be included in the same content channels as those for the RU allocations.

FIG. 37(*b*) shows a second method (option 2) for transmission of an EHT-SIG field applicable to the embodiment, illustrated in FIG. 33, in which four content channels are transmitted. According to an embodiment of option 2, a PPDU transmitted to each of segments obtained by segmentation of the total bandwidth may include different contents, wherein, within each segment, the same content may be repeatedly transmitted in each predetermined frequency band.

For example, if the total bandwidth is 320 MHz and is divided into two respective 160 MHz segments, different common fields in primary 160 that is a first segment and secondary 160 MHz that is a second segment may be repeatedly included in the content channels and transmitted every 20 MHz. The common fields may indicate different numbers signaled in Number of RU Allocation subfields. In RU allocation fields that appear afterwards, different RU allocation fields 1 and 2 and different RU allocation fields 3 and 4 are included in primary 160 and secondary 160, respectively, so as to be transmitted. RU allocation fields 1 and 2 may be repeatedly included in the content channel every 40 MHz in primary 160 MHz so as to be transmitted, and RU allocation fields 3 and 4 may be repeatedly included in the content channel every 40 MHz in secondary 160 MHz so as to be transmitted. User specific fields 1 and 2 corresponding to the two RU allocation fields 1 and 2 shown in primary 160 MHz repeatedly appear every 40 MHz in primary 160 MHz, and user specific fields 3 and 4 corresponding to the two RU allocation fields 3 and 4 shown in secondary 160 MHz repeatedly appear every 40 MHz in secondary 160 MHz. Channels, in which the four types of RU allocation fields 1, 2, 3, and 4 and user specific fields 1, 2, 3, and 4 corresponding thereto are shown, may be referred to as content channels 1, 2, 3, and 4, respectively.

That is, in other words, the EHT-SIG field may include at least one content channel, and fields included in the content channels transmitted from respective segments may have different values, and may be repeatedly transmitted in each predetermined frequency band within the same segment.

For example, if the total band is 160 MHz and each of segments is 80 MHz, and two content channels (a first content channel and a second content channel) may be transmitted in the respective segment.

In this case, fields constituting the first content channel and second content channel transmitted from the first segment and fields constituting the first content channel and second content channel transmitted from the second segment are the same, but contents included in the respective fields may be different. The first content channel and the second content channel transmitted in the first segment and the second segment may be repeatedly transmitted while occupying 20 MHz. For example, if the first content channel is transmitted at lowest 20 MHz of 80 MHz, the second content channel may be transmitted at subsequent 20 MHz, and then the first content channel may be transmitted at next 20 MHz.

That is, in different 80 MHz segments, content channels having the same index have the same field configuration, but contents included in respective fields may be different.

Figure 38:
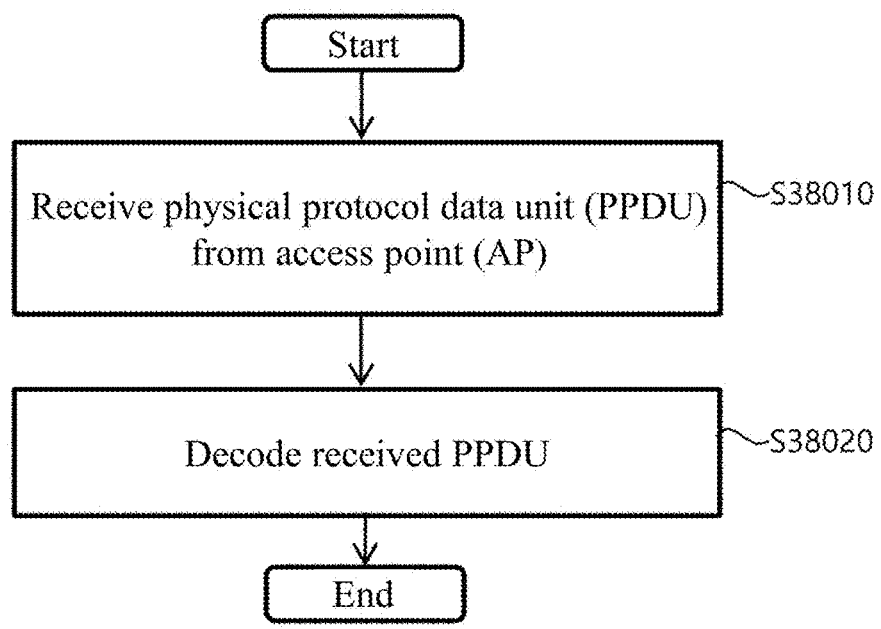
FIG. 38 is a flowchart illustrating an example of a method for receiving a PPDU by a terminal according to an embodiment of the present invention.

FIG. 38 is a flowchart illustrating an example of a method for receiving a PPDU by a terminal according to an embodiment of the present invention.

Referring to FIG. 38, a terminal may receive a PPDU from an AP and decode the same, wherein some fields of the PPDU transmitted to different terminals may be configured to have the same value between different terminals.

Specifically, the terminal may receive a physical protocol data unit (PPDU) from the access point (AP) (S38010), and may decode the received PPDU (S38020).

The received PPDU may include a universal signal (U-SIG) field and an extremely high throughput (EHT)-SIG field including at least one content channel, and may be included in at least one PPDU transmitted to at least one terminal by multi-user (MU) multi-input multi-output (MIMO) performed by the AP.

The at least one content channel may include a common field in which the same value is configured for at least one terminal, and a user specific field that is individually configured for each of the at least one terminal.

In this case, at least one field of the terminal specific field may be configured to have the same value between the at least one terminal.

The foregoing descriptions of the present invention are for illustrative purposes, and those skilled in the art, to which the present invention belongs, will be able to understand that modification to other specific forms can be easily achieved without changing the technical spirit or essential features of the present invention. Therefore, it should be understood that the embodiments described above are illustrative and are not restrictive in all respects. For example, each element described as a single type may be implemented in a distributed manner, and similarly, elements described as being distributed may also be implemented in a combined form.

The scope of the present invention is indicated by claims to be described hereinafter rather than the detailed description, and all changes or modifications derived from the meaning and scope of the claims and their equivalent concepts should be interpreted as being included in the scope of the present invention.

The invention claimed is:

1. A terminal in a wireless communication system, the terminal comprising:
a communication module; and
a processor configured to control the communication module,
wherein the processor configured to:
receive a physical protocol data unit (PPDU) including a universal signal (U-SIG) field and an extremely high throughput signal (EHT-SIG) field from an access point (AP), and
decode the received PPDU,
wherein a mode field included in the PPDU is related to a puncturing pattern of a resource unit (RU) according to a value indicated by a bandwidth field,
wherein the EHT-SIG field includes a first content channel and a second content channel,
wherein the U-SIG field includes the bandwidth field related to a total bandwidth of the PPDU.

2. The terminal of claim 1,
wherein the total bandwidth comprises a plurality of subblocks when the total bandwidth is greater than a specific bandwidth, and
wherein at least one field among two or more fields of a same type constituting the first content channel and the second content channel indicates a same value in a same subblock among the plurality of subblocks.

3. The terminal of claim 1,
wherein the puncturing pattern is identified based on a combination of the bandwidth field and the mode field.

4. The terminal of claim 1,
wherein the mode field indicates a changed puncturing pattern according to a changed total bandwidth when the total bandwidth is changed.

5. The terminal of claim 4,
wherein puncturing according to the puncturing pattern is applied to remaining channels except a primary 20 MHz channel among the total bandwidth, and
wherein a unit of bandwidth punctured by the puncturing pattern increases as the total bandwidth associated with the bandwidth field increases.

6. The terminal of claim 1,
wherein the first content channel and the second content channel are transmitted alternately on a frequency axis at a regular frequency interval in each of the plurality of subblocks.

7. The terminal of claim 1,
wherein the at least one field includes at least one of a Low-Density Parity Check Code (LDPC) Extra Symbol Segment field, a space-time block coding (STBC) field, a Pre-FEC Padding Factor field or a Guard-Interval (GI)+long training field (LTF) Size field.

8. The terminal of claim 1,
wherein the first content channel and the second content channel include a common field including the at least one field.

9. A method for receiving data by a terminal in a wireless communication system, the method comprising:
receiving a physical protocol data unit (PPDU) including a universal signal (U-SIG) field and an extremely high throughput signal (EHT-SIG) field from an access point (AP); and
decoding the received PPDU,
wherein a mode field included in the PPDU is related to a puncturing pattern of a resource unit (RU) according to a value indicated by a bandwidth field,
wherein the EHT-SIG field includes a first content channel and a second content channel,
wherein the U-SIG field includes the bandwidth field related to a total bandwidth of the PPDU.

10. The method of claim 9,
wherein the total bandwidth comprises a plurality of subblocks when the total bandwidth which the PPDU is transmitted is greater than a specific bandwidth, and wherein at least one field among two or more fields of a same type constituting the first content channel and the second content channel indicates a same value in a same subblock among the plurality of subblocks.

11. The method of claim 9,
wherein the puncturing pattern is identified based on a combination of the bandwidth field and the mode field.

12. The method of claim 9,
wherein the mode field indicates a changed puncturing pattern according to a changed total bandwidth when the total bandwidth is changed.

13. The method of claim 12,
wherein puncturing according to the puncturing pattern is applied to remaining channels except a primary 20 MHz channel among the total bandwidth, and
wherein a unit of bandwidth punctured by the puncturing pattern increases as the total bandwidth associated with the bandwidth field increases.

14. The method of claim 10,
wherein the first content channel and the second content channel are transmitted alternately on a frequency axis at a regular frequency interval in each of the plurality of subblocks.

15. The method of claim 10,
wherein the at least one field includes at least one of a Low-Density Parity Check Code (LDPC) Extra Symbol Segment field, a space-time block coding (STBC) field, a Pre-FEC Padding Factor field or a Guard-Interval (GI)+long training field (LTF) Size field.

16. The method of claim 10,
wherein the first content channel and the second content channel include a common field including the at least one field.

* * * * *